United States Patent
Kishimoto et al.

(10) Patent No.: US 10,344,634 B2
(45) Date of Patent: Jul. 9, 2019

(54) MOTOR DRIVE DEVICE FOR CONTROLLING VALVE TIMING OF INTERNAL COMBUSTION ENGINE

(71) Applicant: DENSO CORPORATION, Kariya, Aichi-pref. (JP)

(72) Inventors: Yoshifumi Kishimoto, Kariya (JP); Masatake Sato, Kariya (JP)

(73) Assignee: DENSO CORPORATION, Kariya (JP)

( * ) Notice: Subject to any disclaimer, the term of this patent is extended or adjusted under 35 U.S.C. 154(b) by 100 days.

(21) Appl. No.: 15/561,594

(22) PCT Filed: Apr. 8, 2016

(86) PCT No.: PCT/JP2016/001953
§ 371 (c)(1),
(2) Date: Sep. 26, 2017

(87) PCT Pub. No.: WO2016/194281
PCT Pub. Date: Dec. 8, 2016

(65) Prior Publication Data
US 2018/0066549 A1 Mar. 8, 2018

(30) Foreign Application Priority Data
Nov. 27, 2015 (JP) .................................. 2015-231735

(51) Int. Cl.
*F01L 1/356* (2006.01)
*H02P 6/15* (2016.01)
(Continued)

(52) U.S. Cl.
CPC .......... *F01L 1/356* (2013.01); *B60R 16/0232* (2013.01); *F01L 1/344* (2013.01);
(Continued)

(58) Field of Classification Search
CPC . F01L 1/344; F01L 2820/041; F01L 2810/03; F01L 2800/01; F01L 2250/02;
(Continued)

(56) References Cited

U.S. PATENT DOCUMENTS 5,097,192 A * 3/1992 Iijima ..................... H02P 6/08
318/712
5,298,839 A * 3/1994 Takeda ..................... H02P 6/06
318/400.02
(Continued)

FOREIGN PATENT DOCUMENTS

JP 2006-183603 A 7/2006
JP 2008-215274 A 9/2008
(Continued)

*Primary Examiner* — Mark A Laurenzi
*Assistant Examiner* — Wesley G Harris
(74) *Attorney, Agent, or Firm* — Posz Law Group, PLC

(57) ABSTRACT

A motor drive device for valve timing control of an internal combustion engine includes: a motor drive unit that controls a phase of a camshaft to drive a motor for controlling opening and closing operation of a valve; and a determination unit that determines whether a timing is to start up the motor or to normally drive the motor. The motor drive unit drives the motor with an advance angle when it is determined that the timing is to normally drive the motor by the determination unit, and the motor drive unit normally drives the motor without the advance angle when it is determined that the timing is to start up the motor.

9 Claims, 21 Drawing Sheets

(51) Int. Cl.
  *B60R 16/023* (2006.01)
  *H02P 6/08* (2016.01)
  *H02P 6/24* (2006.01)
  *F01L 1/344* (2006.01)
  *F01L 1/053* (2006.01)

(52) U.S. Cl.
  CPC ............... *H02P 6/08* (2013.01); *H02P 6/153* (2016.02); *H02P 6/157* (2016.02); *H02P 6/24* (2013.01); *F01L 2001/0537* (2013.01); *F01L 2201/00* (2013.01); *F01L 2250/02* (2013.01); *F01L 2800/01* (2013.01); *F01L 2810/03* (2013.01); *F01L 2820/032* (2013.01); *F01L 2820/041* (2013.01); *H02P 2205/05* (2013.01)

(58) Field of Classification Search
  CPC ........... F01L 2201/00; F01L 2001/0537; F01L 2820/032; B60R 16/0232; H02P 6/157; H02P 6/153; H02P 6/24; H02P 6/08; H02P 2205/05
  See application file for complete search history.

(56) References Cited

U.S. PATENT DOCUMENTS

| | | |
|---|---|---|
| 2005/0205029 A1 | 9/2005 | Takemura et al. |
| 2007/0144473 A1 | 6/2007 | Nakamura et al. |
| 2009/0267549 A1 | 10/2009 | Kitagawa |
| 2010/0108027 A1 | 5/2010 | Nakamura et al. |
| 2011/0266982 A1* | 11/2011 | Rollman ................ H02P 29/02 318/376 |
| 2012/0174883 A1 | 7/2012 | Kokubo et al. |
| 2015/0303798 A1* | 10/2015 | Okamura .............. H02M 3/156 323/283 |
| 2016/0215662 A1 | 7/2016 | Sato et al. |
| 2016/0359434 A1 | 12/2016 | Numata et al. |
| 2018/0287528 A1* | 10/2018 | Kitano ................. H02P 29/024 |

FOREIGN PATENT DOCUMENTS

| | | |
|---|---|---|
| JP | 2010-132015 A | 6/2010 |
| JP | 2010-200466 A | 9/2010 |
| JP | 2013-055767 A | 3/2013 |
| JP | 2014-051899 A | 3/2014 |

\* cited by examiner (a)

(b)

(a)

(b)

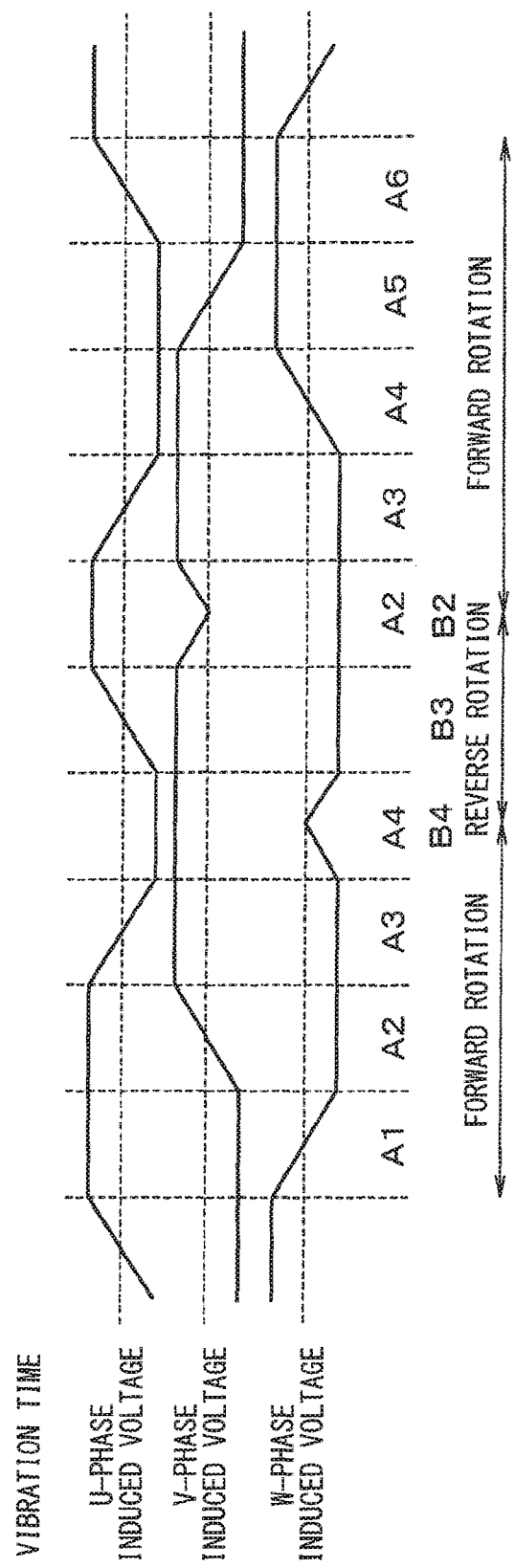

US 10,344,634 B2

MOTOR DRIVE DEVICE FOR CONTROLLING VALVE TIMING OF INTERNAL COMBUSTION ENGINE

CROSS REFERENCE TO RELATED APPLICATIONS

This application is a U.S. national stage of International Patent Application No. PCT/JP2016/001953 filed on Apr. 8, 2016 and is based on Japanese Patent Application No. 2015-114798 filed on Jun. 5, 2015, and Japanese Patent Application No. 2015-231735 filed on Nov. 27, 2015, the disclosures of which are incorporated herein by reference.

TECHNICAL FIELD

The present disclosure relates to a motor drive device for controlling a valve timing of an internal combustion engine.

BACKGROUND ART

In order to obtain an optimum torque and an optimum output of an engine, an electric variable cam timing (VCT) system grasps an operation state such as a rotation speed and an accelerator opening degree, and continuously controls a phase of a cam. In this manner, the electric variable cam timing system optimizes opening and closing timing of an intake valve for supplying an air to the engine and an exhaust valve for discharging an exhaust gas. In Patent Literature 1, in the case where the engine is stopped when the cam is in an advance angle state, a phase angle of the cam is set to a most retarded angle at the time of a next starting to thereby improve the startability.

PRIOR ART LITERATURES

Patent Literature

Patent Literature 1: JP 2005-264804 A

SUMMARY OF INVENTION

The present inventors have ascertained that with the application of the technique disclosed in Patent Literature 1, a battery voltage tends to decrease due to cranking at the time of starting, and a motor for driving a camshaft in the electric VCT system becomes in a vibration state to repeatedly rotate in a forward direction and a reverse direction when the battery voltage becomes equal to or less than a certain predetermined voltage. When the motor comes to the vibration state, a control device may erroneously determine that the motor is in a regenerative state at the time of reverse rotation of the motor. In this case, if it transits to a regenerative control, the control may be disabled from a stopped state of the motor.

An object of the present disclosure is to provide a motor drive device for valve timing control of an internal combustion engine, which is capable of preventing a motor from becoming uncontrollable and reducing vibration of the motor.

According to an aspect of the present disclosure, a motor drive device for controlling valve timing of an internal combustion engine includes: a motor drive unit and a determination unit. The motor drive unit controls a phase of a camshaft to drive a motor for controlling opening and closing operation of a valve. The determination unit determines whether a timing is to start up the motor or to normally drive the motor. The motor drive unit drives the motor with an advance angle when it is determined that the timing is to normally drive the motor by the determination unit, and the motor drive unit normally drives the motor without the advance angle when it is determined that the timing is to start up the motor. Specifically, the determination unit determines whether cranking at the time of starting the engine is immediately after engine startup or not, and performs the normal control immediately after the start of the engine to increase the drive torque without performing the advance angle control. As a result, the drive torque does not fall below the detent torque, and the motor no longer repeats forward/reverse rotation, such that vibration of the motor can be restricted.

BRIEF DESCRIPTION OF DRAWINGS

The above and other objects, features and advantages of the present disclosure will become more apparent from the following detailed description made with reference to the accompanying drawings. In the drawings, FIG. 22 is a diagram schematically showing an induced voltage of each phase in a vibration state.

DESCRIPTION OF EMBODIMENTS

Figure 1:
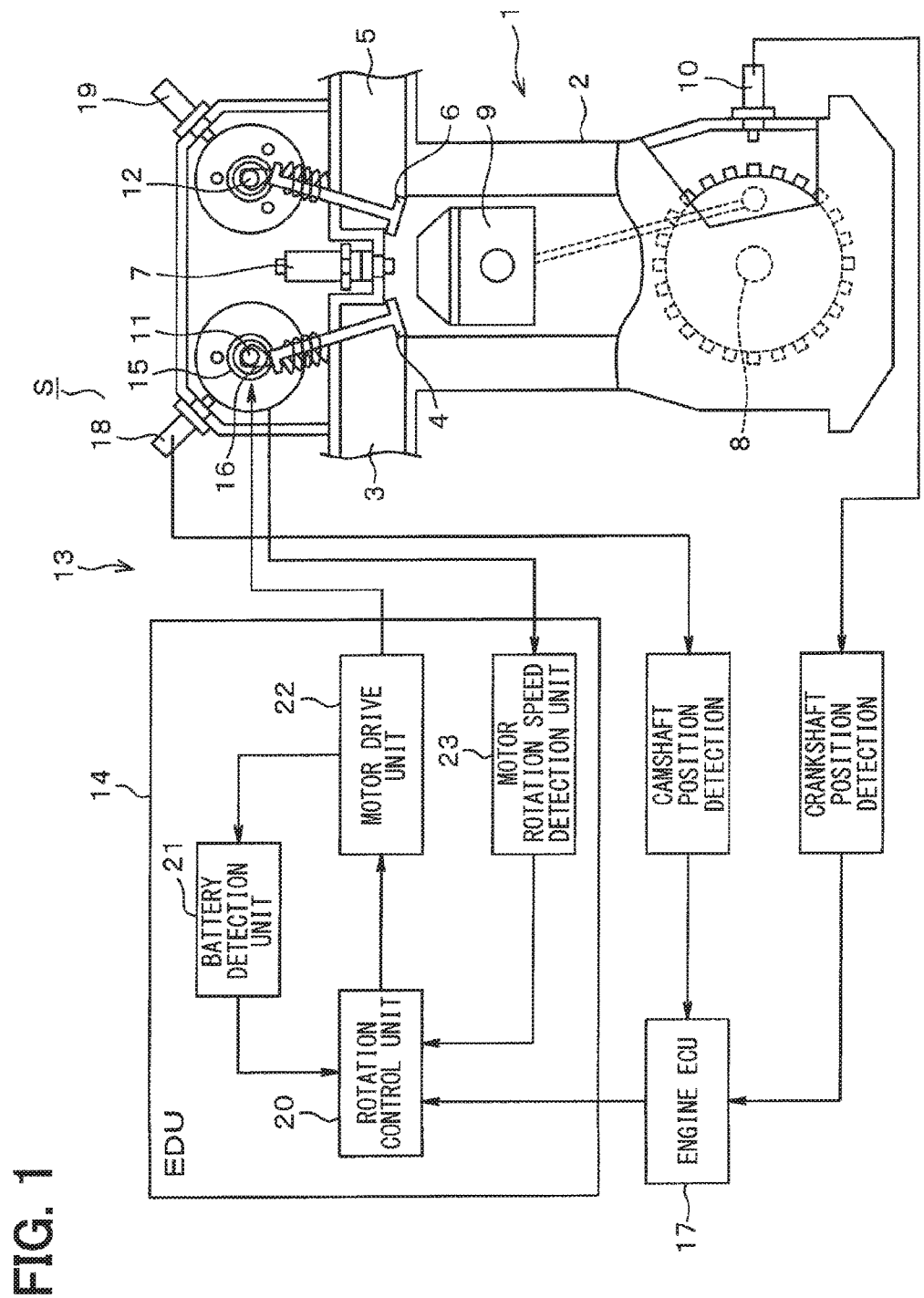
FIG. 1 is a block diagram schematically showing a configuration of an engine system according to a first embodiment.

Hereinafter, several embodiments of a motor drive device for valve timing control of an internal combustion engine will be described with reference to the drawings. In each of the embodiments described below, the same or similar reference numerals denote configurations that perform the same or similar operations. The same reference numerals are attached to the tens order and the one order for the corresponding configuration described in the following embodiments. Since those corresponding configurations have the same functions as each other, a description of the functions executed individually or in cooperation between the respective elements will be omitted as necessary.

(First Embodiment)

FIGS. 1 to 11 schematically show a first embodiment. FIG. 1 shows a configuration of an electric variable cam timing (VCT) system S. A control system in which a driving source of a VCT system is operated by an electric motor is referred to as an electric VCT system S. The electric VCT system S is a system for optimizing the opening and closing timing of a valve, and can perform an improvement in a fuel consumption caused by a reduction in an exhaust emission and a reduction in a pumping loss, and an improvement in an engine output caused by an improvement in intake and exhaust efficiency.

An engine block 2, an intake path 3, an intake valve 4 that is disposed in the intake path 3, an exhaust path 5, an exhaust valve 6 that is disposed in the exhaust path 5, an ignition spark plug 7, a crankshaft 8, a piston 9, and so on are installed in an engine body 1 as an internal combustion engine. A crank angle sensor 10 is installed outside the crankshaft 8, and the crank angle sensor 10 detects a position of the crankshaft.

A power of the crankshaft 8 is transmitted to a sprocket through a timing chain not shown, and is transmitted to an intake camshaft 11 and an exhaust camshaft 12. The intake camshaft 11 is equipped with a valve timing control motor drive device 13 for adjusting an advance angle amount (VCT phase, relative rotation phase) of the intake camshaft 11 relative to the crankshaft 8.

Figure 2:
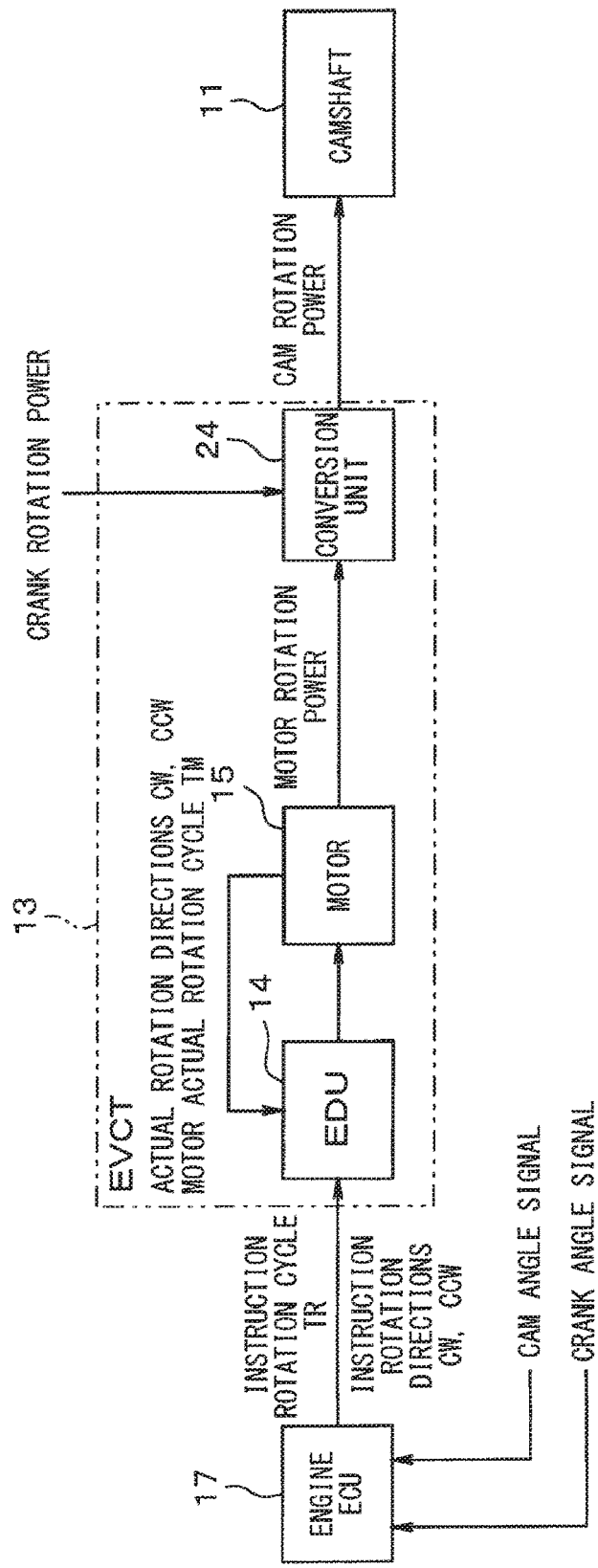
FIG. 2 is an illustrative view schematically illustrating a flow of commands and information and related operation.

FIG. 2 schematically shows a flow of commands and information and the contents of related operation. As shown in FIG. 2, the valve timing control motor drive device 13 includes an EDU 14, a motor 15 that operates with the use of a battery electric power, and a conversion unit 24 that transmits a cam rotation power to the camshaft 11 to change a phase (hereinafter referred to as "cam phase") of the camshaft 11 with the use of a rotation power of the motor 15 and a rotation power of the crankshaft 8. The valve timing control motor drive device 13 transmits a power generated by the conversion unit 24 to the camshaft 11 to change the cam phase according to a control of an engine electronic control unit (ECU) 17.

An intake cam angle sensor 18 for outputting an angle pulse signal as an intake cam angle signal at a predetermined cam angle is attached to the outer peripheral side of the intake camshaft 11. An exhaust cam angle sensor 19 for outputting an angle pulse signal as an exhaust cam angle signal at a predetermined cam angle is attached to an outer peripheral side of the exhaust camshaft 12. The intake cam angle sensor 18 is provided for detecting a camshaft position and is connected to the engine ECU 17.

As shown in the electric configuration block in FIG. 1, the EDU 14 is configured by combining circuits of a microcomputer such as an integrated circuit 26 and a storage unit (not illustrated) such as various IC, RAM, ROM, and EEPROM. The EDU 14 functions as a rotation control unit 20 as a determination unit, a battery detection unit (corresponding to a detection unit) 21, a motor drive unit 22, and a motor rotation speed detection unit (corresponding to a motor rotation cycle acquisition unit and a motor actual rotation direction acquisition unit) 23. The battery detection unit 21 detects a battery voltage VB, subjects the detected battery voltage VB to A/D conversion, and outputs the A/D converted voltage VB as a digital value to the rotation control unit 20. The motor rotation speed detection unit 23 detects an actual rotation cycle (actual rotation speed) of the motor, and outputs an actual measurement value TM of the actual rotation cycle and actual rotation direction CW, CCW to the rotation control unit 20. The intake cam angle sensor 18 detects an intake cam angle signal and outputs the detected signal to the engine ECU 17 as an intake camshaft position detection signal. The crank angle sensor 10 outputs a crank pulse signal detected at the predetermined crank angle as a crankshaft position detection signal to the engine ECU 17.

Various sensors (intake air pressure sensor, coolant temperature sensor, throttle sensor, and so on, none of which are shown) for detecting the operation state of the engine are connected to the engine ECU 17. The engine ECU 17 performs a fuel injection control for driving the intake valve 4 and the exhaust valve 6 and an ignition control for the spark plug 7 according to the engine operation state detected by the respective various sensors. The engine ECU 17 continuously controls the cam phase with the use of such an electric VCT system S, to thereby optimize the opening and closing timings of the intake valve 4 for supplying air to the cylinder of the engine block 2 and the exhaust valve 6 for exhausting the exhaust gas.

The engine ECU 17 calculates a target rotation speed of the motor 15, for example, based on a difference between the phase of the intake camshaft 11, which can be detected by the intake cam angle sensor 18, and the phase of the crankshaft 8, which can be detected by the crank angle sensor 10, and outputs the calculated difference to the EDU 14. As a result, the engine ECU 17 performs a valve timing control to control the actual valve opening and closing timing of the intake valve 4 to coincide with a target valve opening and closing timing. The rotation control unit 20 of the EDU 14 outputs a duty value corresponding to a duty ratio of a PWM signal based on the detected voltage of the battery detection unit 21 and the actual rotation cycle and the actual rotation direction of the motor 15 by the motor rotation speed detection unit 23 to the motor drive unit 22 as a control value. The motor drive unit 22 operates upon receiving the battery voltage VB, and rotationally drives the motor 15 based on a control value given from the rotation control unit 20.

The engine ECU 17 receives an intake cam angle signal (camshaft position detection) and a crank angle signal (crankshaft position detection), calculates an instruction rotation cycle TR corresponding to a target rotation speed and instruction rotation directions CW and CCW corresponding to rotation torque directions, and outputs the calculated results to the rotation control unit 20 of the EDU 14. In addition to the instruction rotation cycle TR and the instruction rotation directions CW and CCW, which are received from the engine ECU 17, the EDU 14 feeds back the actual rotation cycle TM of the motor 15 detected by the motor rotation speed detection unit 23, that is, the actual rotation number and the actual rotation directions CW and CCW, and rotationally controls the motor 15 so that the actual rotation speed matches the target rotation speed.

Figure 3:
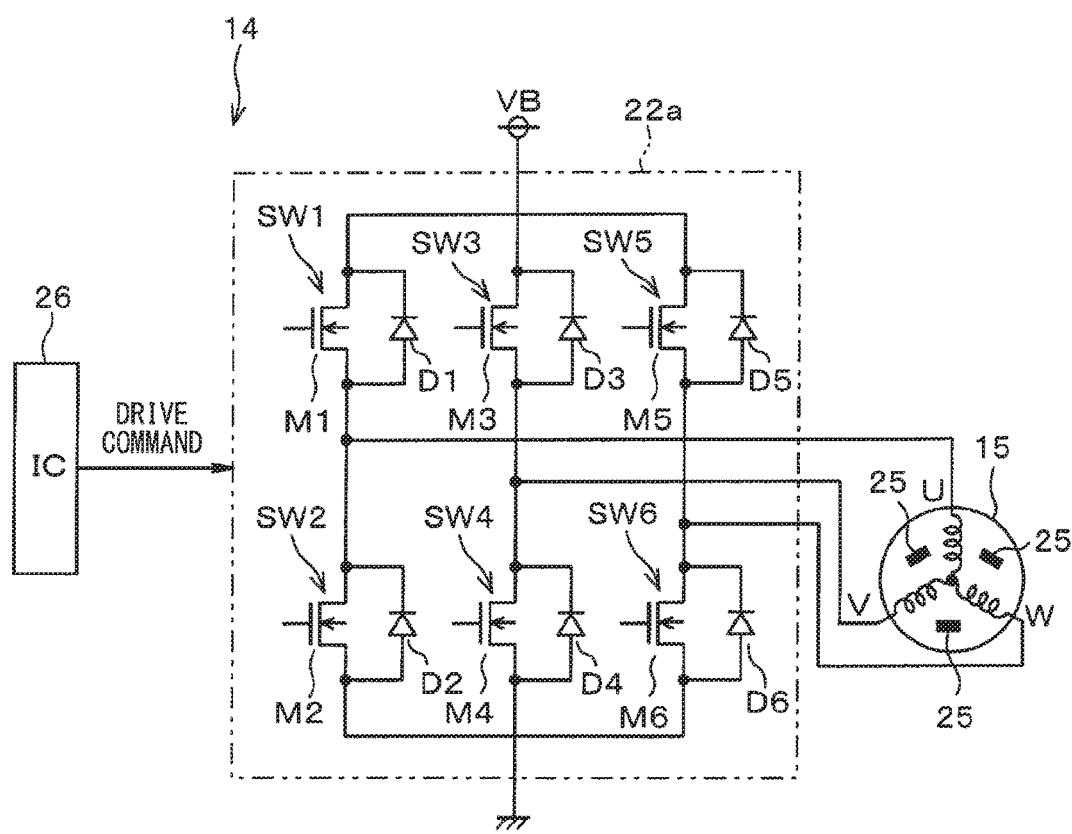
FIG. 3 is a block diagram schematically showing a configuration of an EDU.

The EDU 14 controls the rotation speed of the motor 15 while adjusting the duty value of the PWM signal supplied to multiple switching elements SW1 to SW6 shown in FIG. 3. The conversion unit 24 converts the rotation power of the motor 15 into a cam rotation power with the use of the actual rotation power and the crank rotation power of the motor 15, and transmits the converted cam rotation power to the intake camshaft 11. At this time, the conversion unit 24 changes the cam phase under the following conditions.

Cam advance operation: rotation speed of camshaft 11<rotation speed of motor 15

Cam retard operation: rotation speed of camshaft 11>rotation speed of motor 15

Phase retention: rotation speed of camshaft 11=rotation speed of motor 15

FIG. 3 schematically shows a part of a physical configuration example of the EDU 14. As shown in FIG. 3, the EDU 14 includes a switching unit 22a having the switching elements SW1 to SW6 that turn on/off an energization to the motor 15, a magnetic sensor 25 for detecting a position of a rotor of the motor 15, an integrated circuit (IC) 26 that drives the switching elements SW1 to SW6, which are connected to each other. The integrated circuit 26 is used as a computation unit. The motor drive unit 22 includes the switching unit 22a in which the switching elements SW1 to SW6 are connected in three phases to a node to which a battery voltage VB is applied, and the respective switching elements SW1 to SW6 include to n-channel MOS transistors M1 to M6. Body diodes D1 to D6 connected between the drain and the source in a reverse direction are added to the MOS transistors M1 to M6, respectively. The switching unit 22a is configured by connecting the switching elements SW1 to SW6 in three phases (UVW) between the terminal of the battery voltage VB and the ground.

Referring to the storage unit (not illustrated), the motor drive unit 22 refers to a flag indicative of a rotation control mode or a regenerative control mode, and selects an energization pattern corresponding to the rotation control mode or the regenerative control mode based on the flag, and gives the selected energization pattern to the switching unit 22a having the switching elements SW1 to SW6 to drive the motor 15.

The motor 15 is configured by a three-phase brushless motor, thereby achieving high reliability and long life. When the integrated circuit 26 rotates the motor 15, the integrated circuit 26 turns on one of the switching elements SW1, SW3, and SW5 on an upper arm side of the motor drive unit 22, turns on one of the switching elements SW2, SW4, and SW6 on a lower arm side, and turns off the other switching elements. At this time, the integrated circuit 26 controls the on/off operation of the switching elements SW1 to SW6 without the employment of the on/off energization pattern in which a large through current flows.

<Rotation Control Mode>

Figure 4:
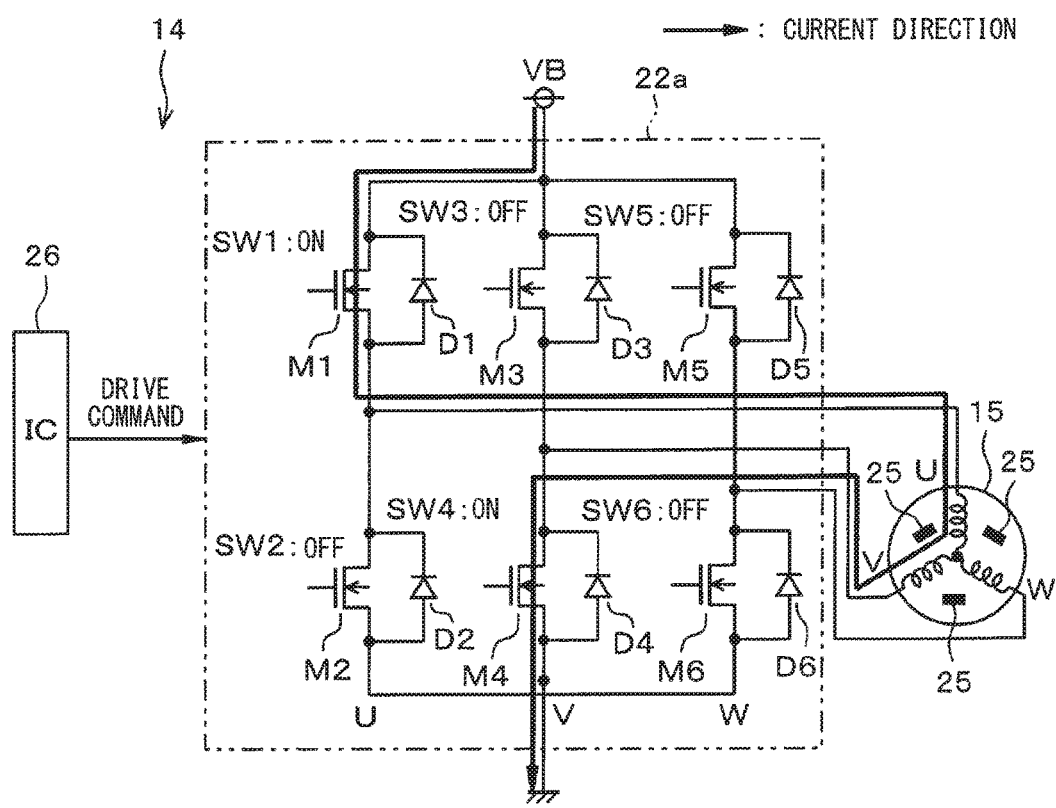
FIG. 4 is an illustrative view showing an energization direction when a motor is rotationally controlled in a rotation control mode.

FIG. 4 shows an energization direction when the motor 15 is rotationally controlled in the rotation control mode. An example shown in FIG. 4 indicates the energization direction when a current flows through a U-phase and a V-phase. When the switching elements SW1 and SW4 are turned on and the other switching elements SW2, SW3, SW5, and SW6 are turned off so that a current flows from the U-phase to the V-phase. In the case where the EDU 14 controls the rotation drive of the motor 15 according to the rotation control mode, when the motor 15 is stopped or when a condition that the instruction rotation torque direction from the engine ECU 17 coincides with the actual rotation torque direction is satisfied, the EDU 14 performs the rotation drive control of the motor 15.

Figure 5:
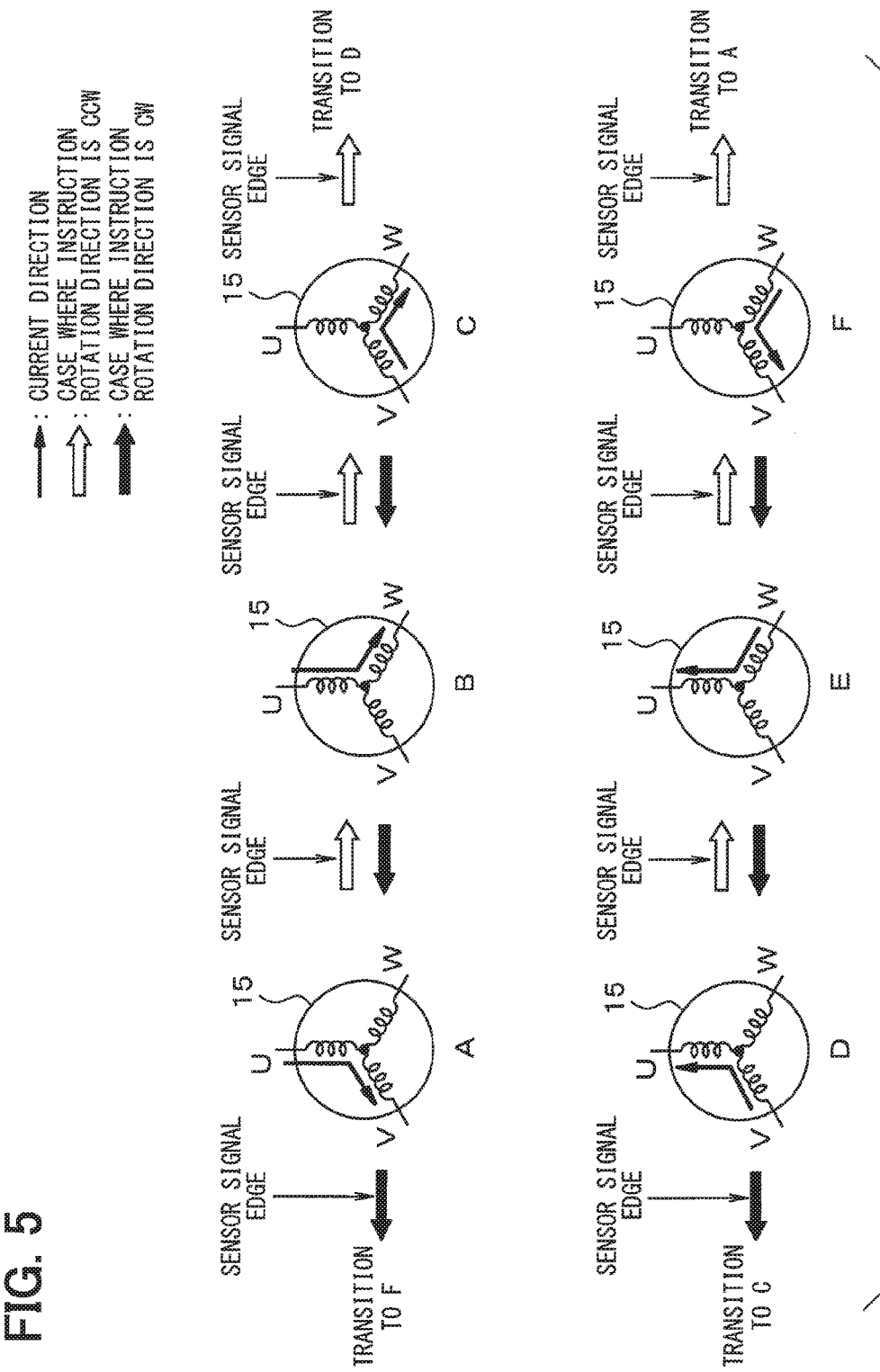
FIG. 5 is an illustrative view showing details of a control in the rotation control mode.

FIG. 5 shows details of the control in the rotation control mode of the motor 15. As shown in FIG. 5, when the command rotation direction (instruction torque direction) by the engine ECU 17 is CCW (counterclockwise direction), the rotation control unit 20 allows a current flowing direction in the rotor of the motor 15 to transition to the counterclockwise direction under the control. Specifically, the rotation control unit 20 operates as follows.

Turning on the switching elements SW1 and SW4 of (upper U-phase, lower V-phase)

→turning on the switching elements SW1 and SW6 of (upper U-phase, lower W-phase)

→turning on the switching elements SW3 and SW6 (upper V-phase, lower W-phase)

→turning on the switching elements SW3 and SW2 (upper V-phase, lower U-phase)

→ . . . (repeating).

On the contrary, when the instruction rotation direction (instruction torque direction) by the engine ECU 17 is CW (clockwise direction), the rotation control unit 20 allows a current flowing direction in the rotor to transition to the clockwise direction under the control. Specifically, the rotation control unit 20 operates as follows.

Turning on the switching elements SW1 and SW4 of (upper U-phase, lower V-phase)

→turning on the switching elements SW5 and SW4 (upper W-phase, lower V-phase)

→turning on the switching elements SW5 and SW2 (upper W-phase, lower U-phase)

→turning on the switching elements SW3 and SW2 (upper V-phase, lower U-phase)

→ . . . (repeating).

<Regenerative Control Mode (Power Generation Control Mode)>

On the other hand, when the motor 15 is rotating, one of the switching elements SW2, SW4, and SW6 on the lower arm side is turned on in a state where all of the switching elements SW1, SW3, and SW5 on the upper arm side are turned off. Then, a current can flow from the ground side toward a terminal side of the battery voltage VB. With the above operation, the battery voltage VB can be generated. When any one of the switching elements SW2, SW4, and SW6 on the lower arm side is turned on in this manner, a heat loss can be reduced as compared with the case of energizing the body diodes D2, D4, and D6 of the switching elements SW2, SW4, and SW6 on the lower arm side.

Figure 6:
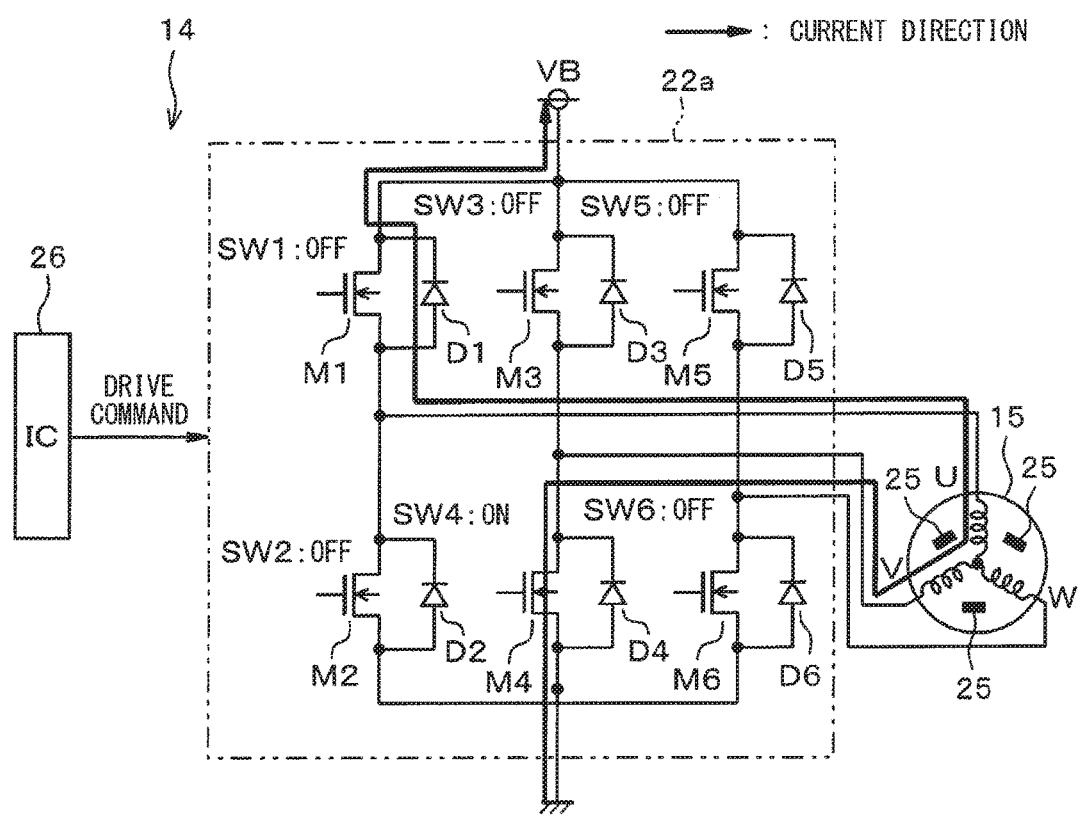
FIG. 6 is an illustrative view showing an energization direction when the motor is controlled in a regenerative control mode.
Figure 7:
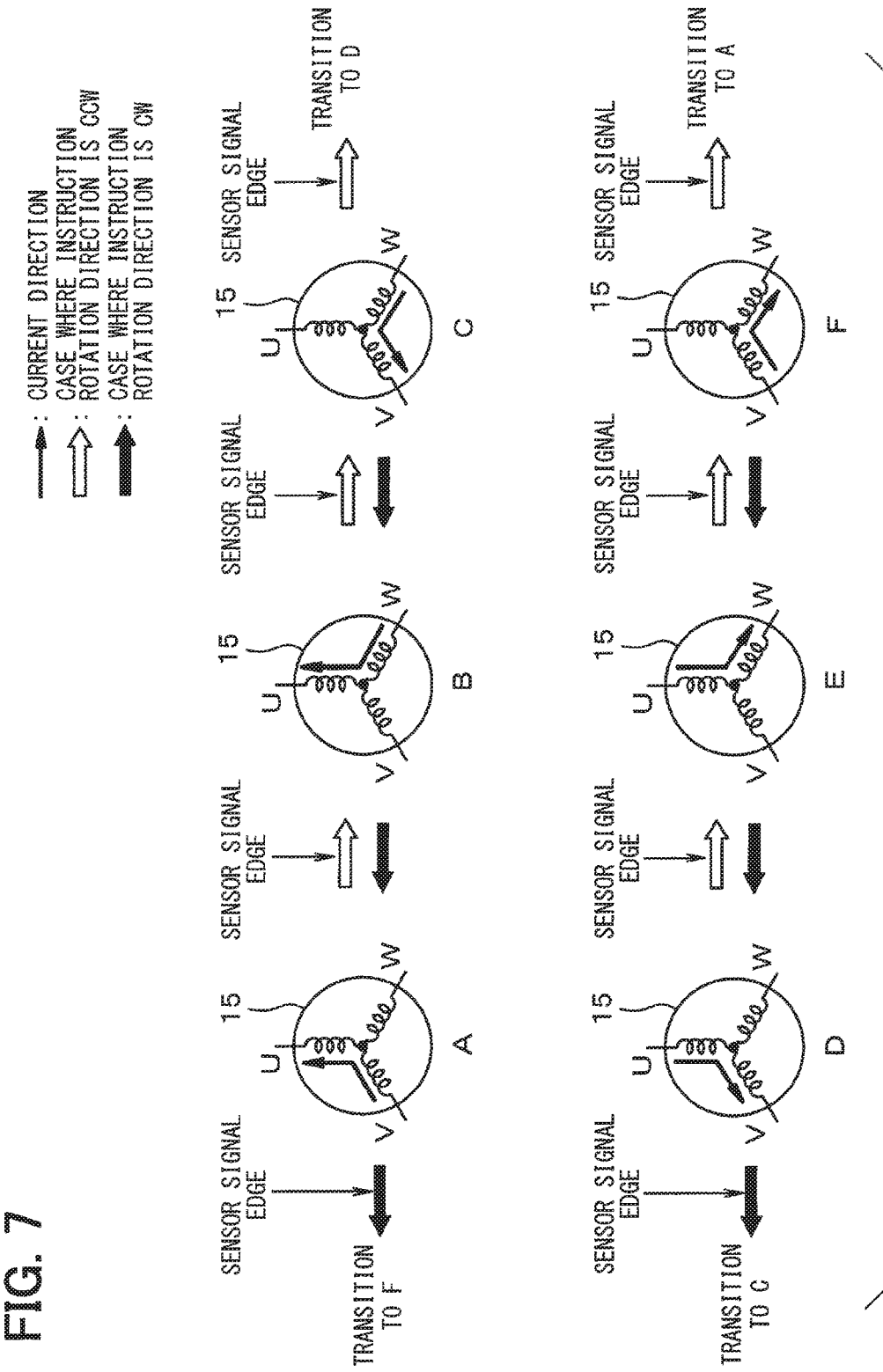
FIG. 7 is an illustrative view showing details of a control in the regenerative control mode.

In the regenerative control mode, the current flows through the body diode D1 of the switching element SW1 on the upper arm side. During the regenerative control, the motor 15 enters a regenerative state, the motor 15 can decelerate, and the electric power can be recovered to the terminal side of the battery voltage VB. FIG. 6 shows an energization direction when the motor 15 is controlled in the regenerative control mode. The example shown in FIG. 6 indicates the energization direction when a current flows through the V-phase to the U-phase. FIG. 7 shows details of controlling the motor 15 in the regenerative control mode. As shown in FIG. 7, when the instruction rotation direction by the engine ECU 17 is the counterclockwise direction CCW, the rotation control unit 20 performs control so as to allow the current flowing direction of the rotor to transition to the counterclockwise direction. Conversely, when the instruction rotation direction by the engine ECU 17 is the clockwise direction CW, the rotation control unit 20 performs control so as to allow the current flowing direction of the rotor to transition to the clockwise direction. The regenerative control is executed when the instruction rotation direction from the engine ECU 17 does not coincide with the actual rotation direction.

Differences between "normal control" and "advance angle control" will be described below.

<Description of Normal Control>

Figure 8:
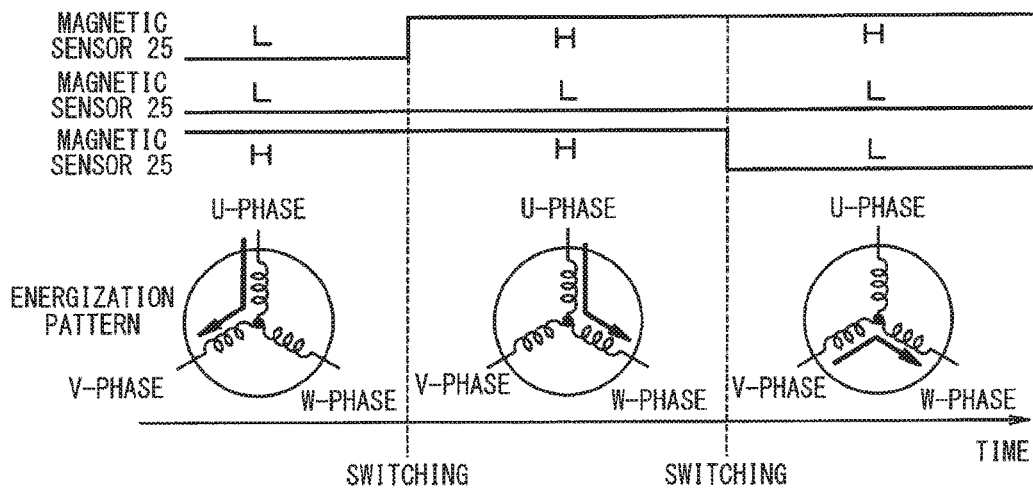
FIG. 8 is an illustrative view schematically showing contents of a normal control.
Figure 8:
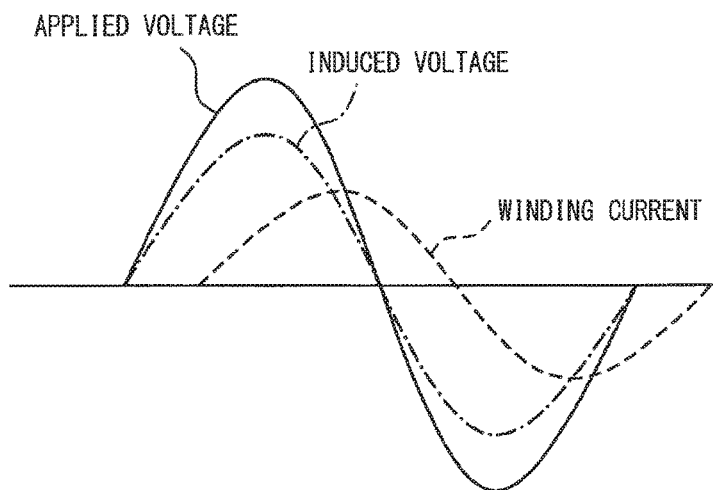

FIG. 8 (a) and FIG. 8 (b) schematically show a normal control method in a rotation control mode of the motor 15 by the rotation control unit 20. As shown in FIG. 8 (a), each of the three magnetic sensors 25 changes to high "H" or low "L" when a current phase applied to each rotor coil changes, and the position of the rotor can be known based on data from the magnetic sensors 25. A drive torque of the motor 15 becomes maximum when a phase difference between an induced voltage and a winding current matches each other. The normal control is a control method of switching the energization pattern to another at timing when a signal of each magnetic sensor 25 changes. At this time, the energization pattern can be controlled so that the applied voltage and the induced voltage match each other. With the employment of the normal control method, as shown in FIG. 8 (b), a phase of the winding current is retarded as compared with the applied voltage because the rotor coil of the motor 15 is large in an inductance component of the winding.

<Description of Advance Angle Control Method>

Figure 9:
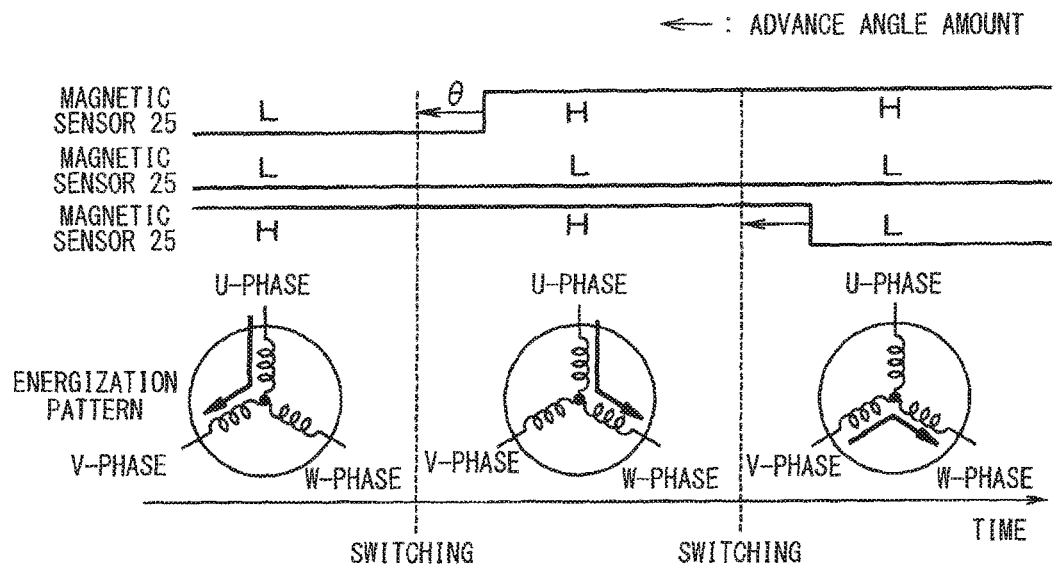
FIG. 9 is an illustrative view schematically showing contents of an advance angle control.
Figure 9:
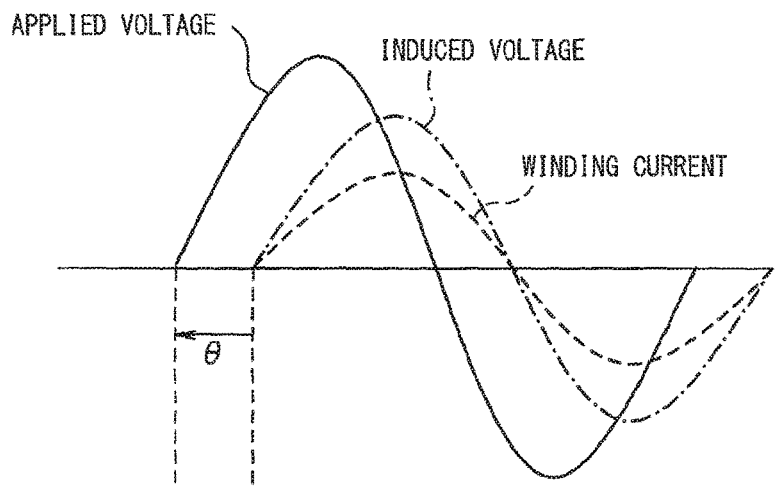

FIG. 9 (a) and FIG. 9 (b) schematically show an advance angle control method. With the employment of the normal control, a phase of the winding current is retarded as compared with the applied voltage because the rotor coil of the motor 15 is large in an inductance component of the winding. With the employment of the normal control, it is difficult to rotate the motor 15 with high efficiency particularly under a high rotation. However, as shown in FIG. 9 (a) and FIG. 9 (b), an advance angle control is executed on the motor 15, thereby being capable of switching the energization pattern to another earlier than timing at which a signal of each magnetic sensor 25 changes. With the control described above, a phase delay of the winding current can be compensated, the motor 15 can be rotated with high efficiency. Although an optimum advance angle amount θ varies according to the motor rotation speed, since the phase delay of the winding current increases more as the rotation speed of the motor 15 increases more, it is desirable to also increase the advance angle amount.

Figure 10:
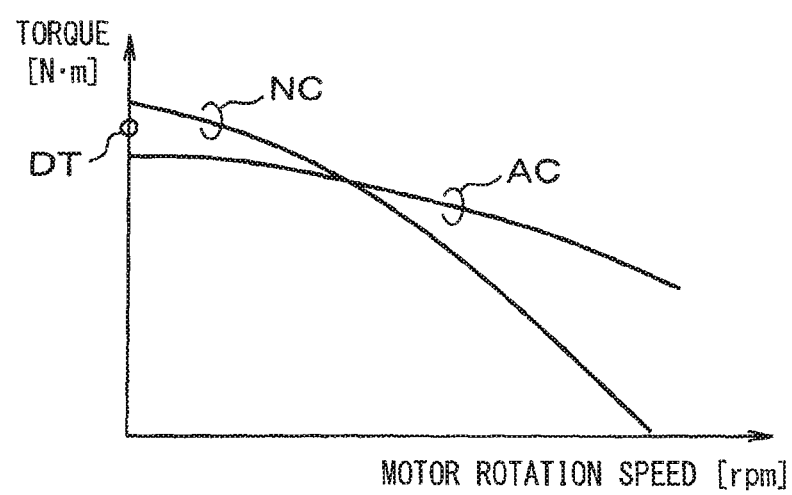
FIG. 10 is a characteristic diagram showing a motor rotation speed dependency of a torque.

FIG. 10 shows an example of the torque characteristics at the time of the normal control and the advance angle control which changes according to the rotation speed of the motor 15. In FIG. 10, a detent torque when the motor 15 stops rotating is indicated as DT. When the torque characteristic NC in the normal control is compared with the torque characteristic AC in the advance angle control, the normal control is higher in the torque in the case of the low rotation, and the advance angle control is higher in the torque in the case of the high rotation.

Figure 11:
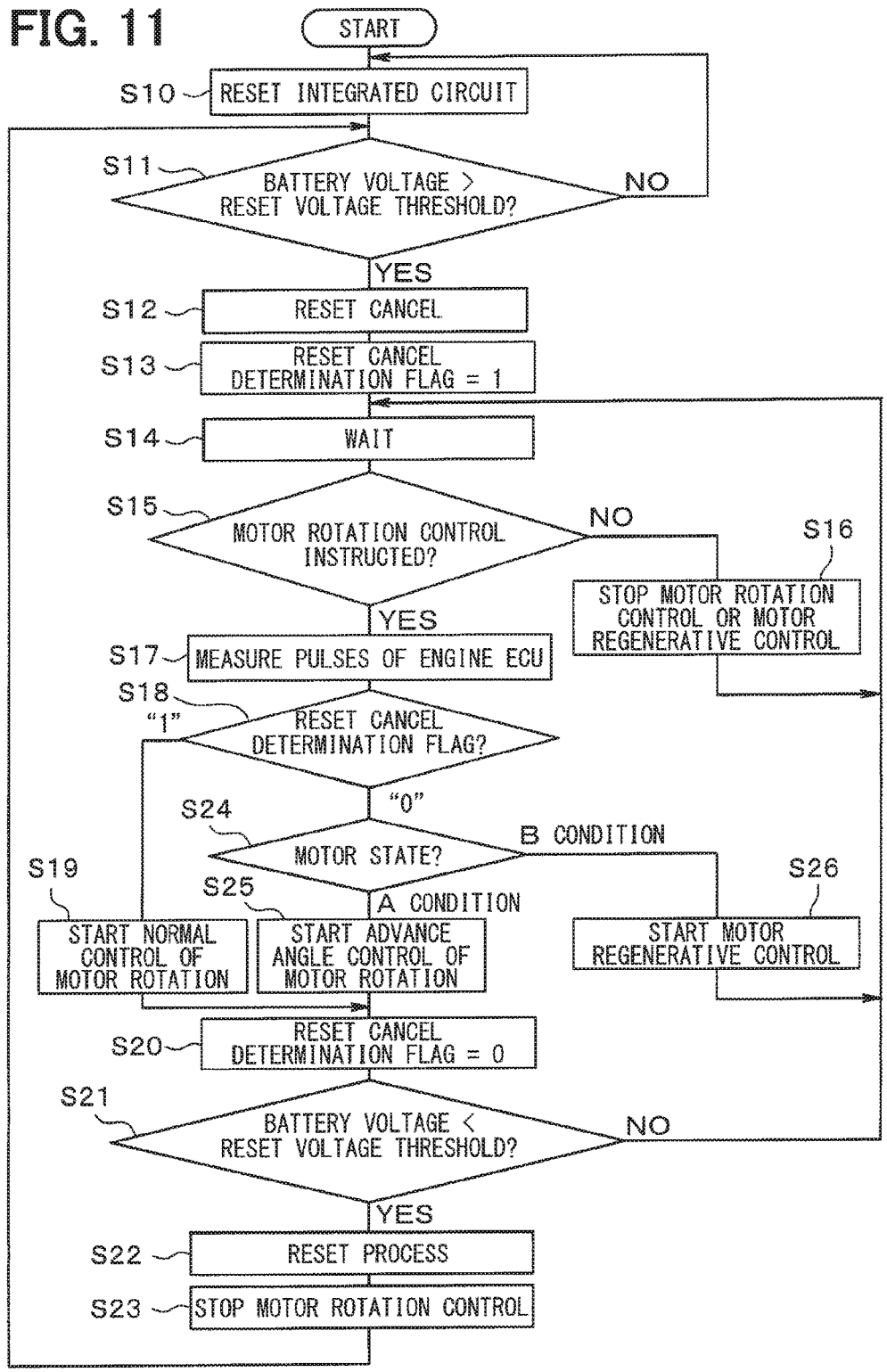
FIG. 11 is a flowchart schematically showing the operation.

Therefore, as shown in a schematic flowchart in FIG. 11, it is desirable that the rotation control unit 20 controls the motor 15. As shown in FIG. 11, when the engine is started, the rotation control unit 20 in the EDU 14 resets, that is, initializes the integrated circuit 26 at the time of activating the EDU 14 after starting the engine (S10). Then, the rotation control unit 20 determines whether the battery voltage VB exceeds a reset voltage threshold of the integrated circuit 26 by the battery detection unit 21, or not (S11). Immediately after the engine starts, cranking occurs, and various control units in the vehicle consume a large electric power with the result that the battery voltage VB tends to decrease. For that reason, the reset voltage threshold is predetermined to a voltage value at which the integrated circuit 26 can operate normally even when releasing the reset of the integrated circuit 26 at such a time.

After the rotation control unit 20 has confirmed that the battery voltage VB exceeds the threshold of the reset voltage by the battery detection unit 21 (yes in S11), the rotation control unit 20 cancels the reset of the integrated circuit 26 (S12). Then, the rotation control unit 20 sets the reset cancel determination flag to "1". The reset cancel determination flag is a flag for determining whether the reset of the integrated circuit 26 has been cancelled, or not, which is a flag for determining whether this time is a timing at which the motor 15 is started, and which is a flag stored in the storage unit not shown. After having set the reset cancel determination flag to "1", the rotation control unit 20 waits for a rotation control instruction given from the engine ECU 17 (S14). The rotation control unit 20 stops the rotation control of the motor 15 or stops the regenerative control of the motor 15 (S16) without the rotation control instruction of the motor 15 given from the engine ECU 17 (no in S15).

Upon receiving the rotation control instruction from the engine ECU 17, the rotation control unit 20 measures pulses supplied from the engine ECU 17 (S17), and determines the rotation instruction cycle (rotation speed) of the motor 15 and the rotation instruction direction according to the cycle and duty value of the pulses. Thereafter, the rotation control unit 20 determines whether the reset cancel determination flag is "1" or "0" (S18). At this time, since the first process is performed after the integrated circuit 26 has been reset, the reset cancel determination flag is set to "1" ("1" in S18). For that reason, the rotation control unit 20 determines that this time is the timing at which the motor 15 is started with the determination that this time is immediately after the reset cancel of the integrated circuit 26, and normally controls the rotation of the motor 15 (S19). At this time, the integrated circuit 26 of the EDU 14 monitors the battery voltage VB, determines whether the battery voltage VB is lower than the reset voltage threshold, or not (S21), and if the battery voltage VB is equal to or higher than the reset voltage threshold, the integrated circuit 26 returns to S11 to continue the processing. In this way, the motor 15 is normally controlled immediately after the integrated circuit 26 has been reset.

The rotation control unit 20 normally controls the rotation of the motor 15 immediately after the integrated circuit 26 has been reset. Thereafter, when the rotation control instruction of the motor 15 from the engine ECU 17 is continued (yes in S15), the reset cancel determination flag is set to "0" in S20. At this time, the process proceeds to the process of S24.

The rotation control unit 20 detects the state of the motor 15 (S24). Specifically, the rotation control unit 20 starts the advance angle control of the motor 15 on the condition that the state of the motor 15 satisfies a condition A (S25). The condition A is a condition indicating that (the motor 15 continues to rotate and the instruction rotation direction coincides with the actual rotation direction), or that the motor 15 is stopped. In this manner, when the instruction rotation direction of the engine ECU 17 is in the same direction as the actual rotation direction immediately after resetting of the integrated circuit 26, the motor 15 can be subjected to the advance angle control in the second and subsequent processing.

The rotation control unit 20 starts the regenerative control on the condition that the state of the motor 15 satisfies a condition B (S26). The condition B indicates that the motor 15 continues to rotate and the instruction rotation direction is different from the actual rotation direction.

When the rotation control unit 20 performs the process of S26, the rotation of the motor is normally controlled in S19, and a considerable time has passed after the reset cancel process ("1" in S18) of the integrated circuit 26. For that reason, even if the regenerative control of the motor 15 is started in S26, the rotation speed of the motor 15 is increased, and the drive torque exceeds the detent torque. This makes it possible to operate normally.

<Processing when Battery Voltage Drops>

Further, the rotation control unit 20 may determine that the battery voltage VB falls below the reset voltage threshold in S21 in both of the first processing immediately after resetting of the integrated circuit 26 and in the second and subsequent processing (yes in S21).

At this time, the rotation control unit 20 performs reset processing of the integrated circuit 26 (S22), and stops the rotation control of the motor 15 (S23). Then, the rotation control unit 20 returns the process to S11 to determine whether the battery voltage VB exceeds the reset voltage threshold, or not (S11). If the battery voltage VB does not exceed the reset voltage threshold (no in S11), the process returns to S10, and resets the integrated circuit 26 (S10).

The rotation control unit 20 continues to wait until the battery voltage VB exceeds the reset voltage threshold (no in S11). In this manner, the integrated circuit 26 is reset again (S10). That is, even when the rotation of the motor 15 is subjected to the normal control or the rotation control in the processing after the reset of the integrated circuit 26, the rotation control unit 20 repeats the reset processing when the battery voltage VB becomes lower than the reset voltage threshold. The rotation control unit 20 does not execute the rotation control of the motor 15 until the battery voltage VB exceeds the reset voltage threshold value. As a result, operational reliability can be improved.

The present inventors have studied a control method different from that described above, and when developing a control unit equivalent to the EDU 14 including the integrated circuit 26 and the rotation control unit 20, the present inventors have studied a system that performs control so that the advance angle control is performed immediately after the integrated circuit 26 has been reset. In that system, when the motor 15 is in a rotation state and the instruction rotation direction and the actual rotation direction do not coincide with each other, the regenerative control is started. If the drive torque of the motor 15 is larger than the detent torque DT, the regenerative operation by the regenerative control can be performed. However, the present inventors have found that when the drive torque of the motor 15 falls below the detent torque, the motor 15 stops after inertia movement. When the motor 15 stops, a signal edge of the magnetic sensor 25 is not detected, the switching of the energization pattern becomes impossible, and there is a possibility that the energization pattern may be fixed to any of the energization patterns of the regenerative control shown in FIG. 7. Because the regenerative control is a control on the premise that the motor 15 has a sufficiently high rotation speed, the control state may become uncontrollable in a vibration state in which the forward rotation and the reverse rotation are repeated.

The present inventors have found that the vibration state of the motor 15 occurs mainly when the reset of the integrated circuit 26 is canceled in a state in which the battery voltage VB is decreasing in a state of engine cranking or the like. In order to deal with such a phenomenon, the present inventors insert the process of S19 as a process immediately after the integrated circuit 26 has been reset to perform the normal control, and do not allow the rotation control unit 20 to determine the regenerative state at the time of startup so as to prevent the motor 15 from being subjected to the regenerative control. This makes it possible to prevent the drive torque from falling below the detent torque DT.

In the present embodiment, the rotation control unit 20 determines whether cranking at the time of starting the engine is immediately after engine startup, or not, and does not perform the advance angle control immediately after the reset cancel of the integrated circuit 26 immediately after the start of the engine. Immediately after engine startup, the rotation control unit 20 performs the normal control to increase the drive torque. As a result, the drive torque does not fall below the detent torque DT, and the motor 15 no longer repeats forward/reverse rotation.

On the condition that the voltage for driving the motor 15 detected by the battery detection unit 21 exceeds the reset voltage threshold, the motor drive unit 22 normally controls the motor 15 at the timing of starting the motor 15, and performs the advance angle control at the timing of normally driving the motor 15. For that reason, when the voltage for driving the motor 15 is insufficient, the drive of the motor 15 is not controlled, and the reliability of control can be enhanced.

When the motor 15 is driven normally, the motor drive unit 22 drives the motor 15 so that the applied voltage of the motor coincides in phase with the induced voltage. When the motor 15 is driven in the advance manner, the motor drive unit 22 advances the applied voltage relative to the induced voltage of the motor 15 for driving. This makes it possible to perform control depending on the situation even when the engine rotates at low rotation speed or high rotation speed.

(Second Embodiment)

FIGS. 12 to 15 illustrate additional illustrative views of a second embodiment. In the second embodiment, reset is continued until the battery voltage VB exceeds the torque threshold voltage so that the torque becomes sufficient.

Figure 12:
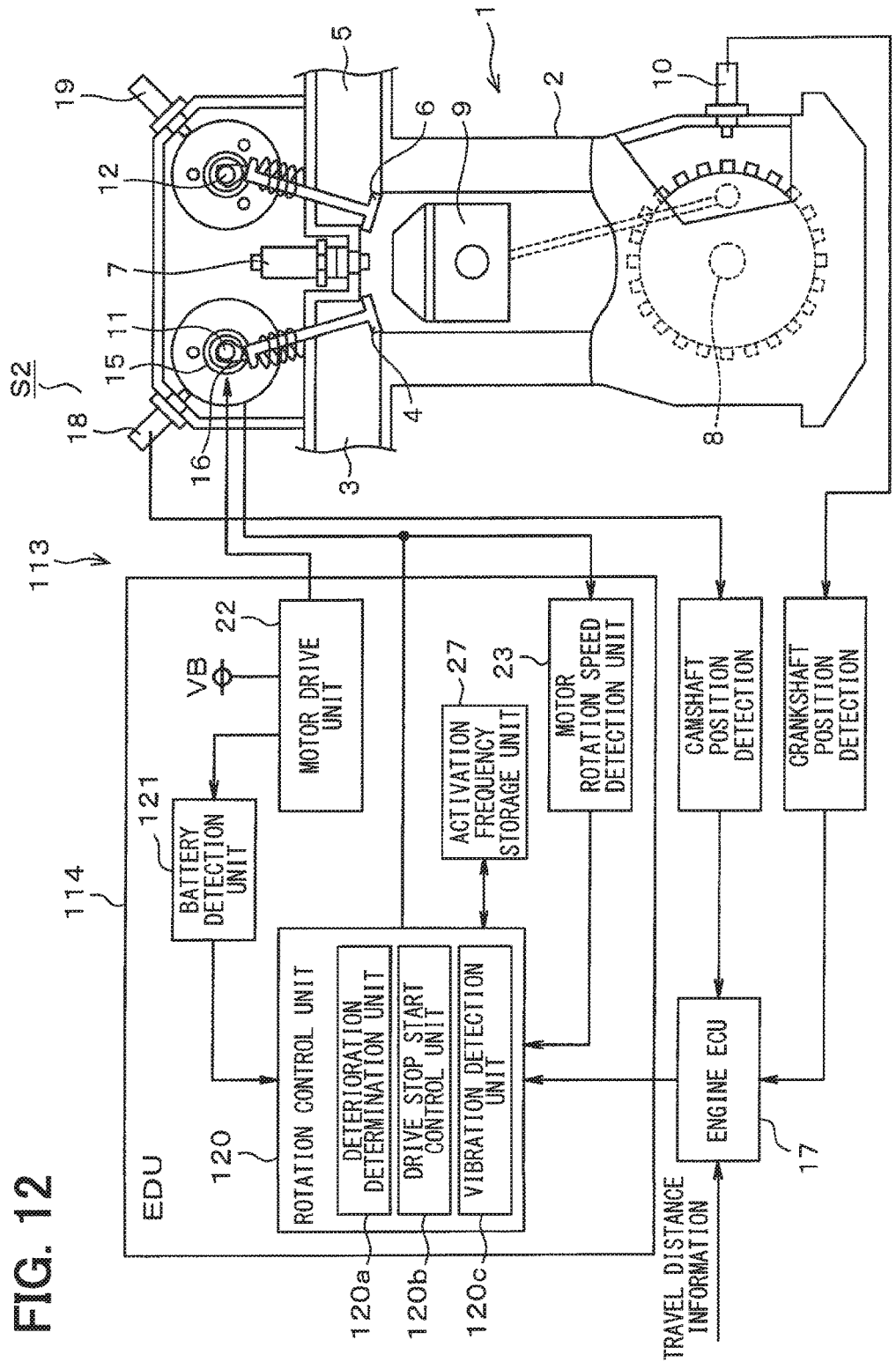
FIG. 12 is a block diagram schematically showing a configuration of an engine system according to a second embodiment.

FIG. 12 shows a configuration diagram of an electric VCT system S2 which is substituted for FIG. 1. The electric VCT system S2 includes a valve timing control motor drive device 113. The valve timing control motor drive device 113 includes an EDU 114, a motor 15 that operates with the use of a battery electric power, and a conversion unit 24 that transmits a cam rotation power to a camshaft 11 with the use of a rotation power of the motor 15 and a rotation power of a crankshaft 8. The valve timing control motor drive device 113 transmits a power generated by the conversion unit 24 to the camshaft 11 under the control of an engine ECU 17 so as to change a cam phase.

The EDU 114 is configured by combining circuits of a microcomputer such as an integrated circuit 26 and a storage unit (not illustrated) such as various IC, RAM, ROM, and EEPROM. The EDU 114 functions as a rotation control unit 120 in place of the rotation control unit 20, a battery detection unit 121, a motor drive unit 22, a motor rotation speed detection unit 23, and an activation frequency storage unit 27. The rotation control unit 120 of the EDU 114 is configured to receive travel distance information input to the engine ECU 17. Like the rotation control unit 20, the rotation control unit 120 functions as a determination unit and also functions as an acquisition unit and a setting unit.

The rotation control unit 120 has functions as a deterioration determination unit 120a, a drive control unit 120b (drive stop start control unit), and a vibration detection unit 120c. The deterioration determination unit 120a, the drive control unit 120b, and the vibration detection unit 120c indicate elements used in the respective embodiments of the second embodiment to the sixth embodiment as functional blocks, and may be provided as functions of the respective embodiments as occasion demands.

The battery detection unit 121 is a block used as a power supply voltage determination unit. The battery detection unit 121 determines whether the battery voltage VB is higher than a predetermined reset voltage threshold, or not, and whether the battery voltage VB is higher than a predetermined torque voltage threshold, or not. The battery detection unit 121 can output the determination results together with the information of the battery voltage VB to the rotation control unit 120. In this example, the torque voltage threshold may be set to be higher than the reset voltage threshold in advance.

The deterioration determination unit 120a indicates a block for determining a deterioration state of components of a vehicle according to the travel distance information of the vehicle or the information on the number of times of activation of the motor drive unit 22. The drive control unit 120b stops the driving of the motor 15 by the motor drive unit 22 or starts the driving of the motor 15 according to the detection result of the battery voltage VB by the battery detection unit 21.

Figure 13:
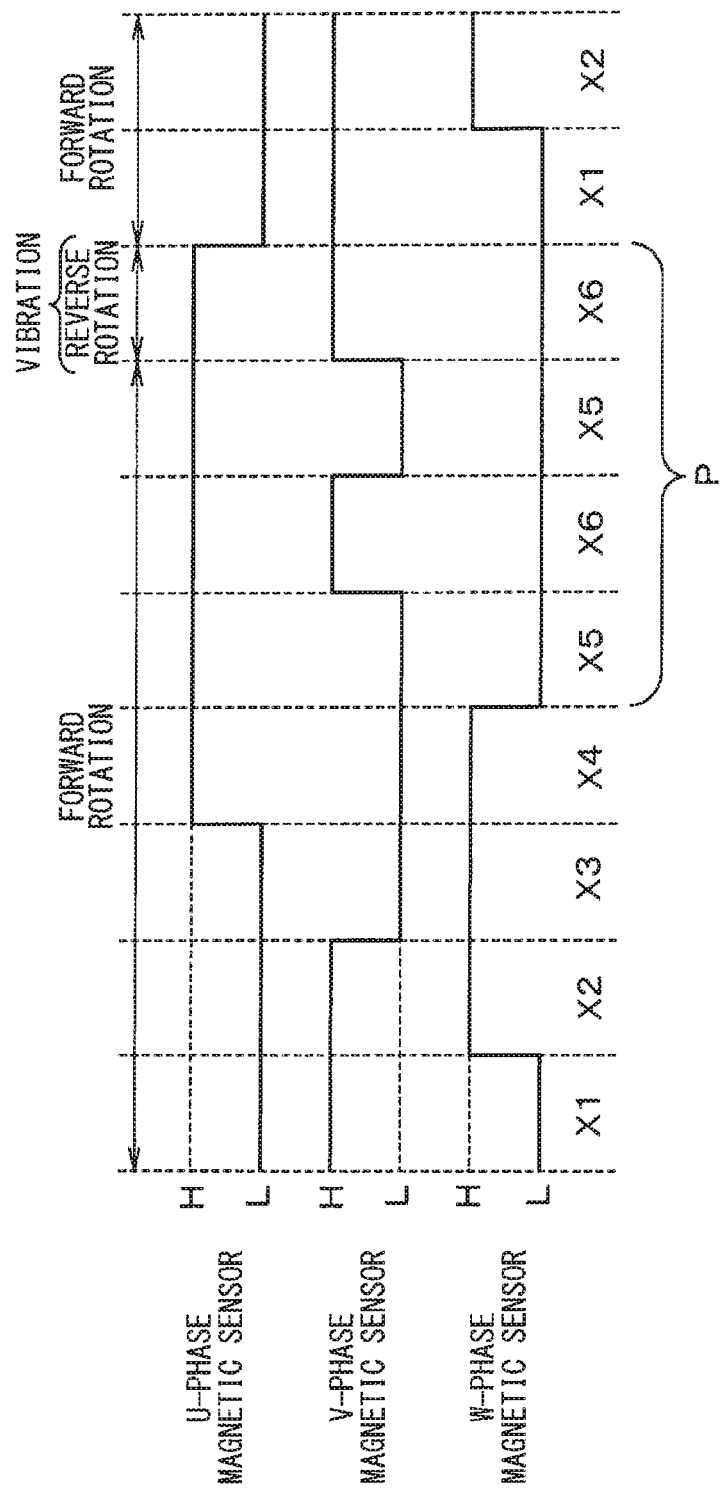
FIG. 13 is a diagram schematically showing an output signal of a magnetic sensor in a vibration state.

The vibration detection unit 120c indicates a block for detecting the presence or absence of vibration according to output signals from magnetic sensors 25 of the motor 15. The magnetic sensors 25 are each configured as a vibration detection unit by, for example, a Hall IC. In this case, the output signals of the magnetic sensors 25 appear as shown in FIG. 13, for example. During a forward rotation, a change occurs so that the detection signals of the magnetic sensors 25 of a U-phase, a V-phase and a W-phase are sequentially shifted in order. As shown in an example in FIG. 13, patterns X1→ ... →X6 are repeated in the forward rotation (for example, clockwise direction CW). In this example, the pattern X1 indicates the U-phase "L", the V-phase "H", and the W-phase "L", the pattern X2 indicates the U-phase "L", the V-phase "H", and the W-phase "H", the pattern X3 indicates the U-phase "L", V-phase "H", and W-phase "H", the pattern X4 indicates the U-phase "H", the V-phase "L", and the W-phase "H", the pattern X5 indicates the U-phase "H", the V-phase "L, and the "W-phase" L", the pattern X6 indicates the U-phase" H", the V-phase" H", and the W-phase" L". For that reason, when receiving the detection signal from the magnetic sensors 25, the vibration detection unit 120c can detect that the motor 15 is rotating in a forward direction. Although not shown, the change is reversed at the time when the motor 15 rotates in a reverse direction (for example, counterclockwise direction CCW). In an example of the patterns X1 to X6 in FIG. 13, the output signal changes so as to repeat the patterns X6→ ... →X1. For that reason, the vibration detection unit 120c can detect that the motor 15 is rotating in reverse.

Further, the vibration detection unit 120c detects, for example, a partial pattern P of forward/reverse such as the patterns X5, X6, X5, X6, and so on to detect that the rotation has reached the reverse rotation from the forward rotation. Thereafter, the vibration detection unit 120c detects that the rotation reaches the pattern X1 to detect that the rotation further reaches the forward rotation from the reverse state. As a result, the vibration detection unit 120c can detect the vibration state in which the motor 15 repeats the forward rotation, the reverse rotation, and the forward direction, and can detect that the rotating direction is in the vibration state when the magnetic sensors 25 detect an instantaneous change in the rotation direction of the motor 15.

The activation frequency storage unit 27 illustrated in FIG. 12 is a block for storing the number of times when the EDU 114 activates the motor 15 by the aid of the motor drive unit 22. The activation frequency storage unit 27 counts each time the rotation control unit 120 activates the motor 15, and stores the number of times of activations in the activation frequency storage unit 27. The rotation control unit 120 is configured to refer to the number of times of activations stored in the activation frequency storage unit 27, and drive the motor 15 by the aid of the motor drive unit 22 based on the number of times of activations.

Figure 14:
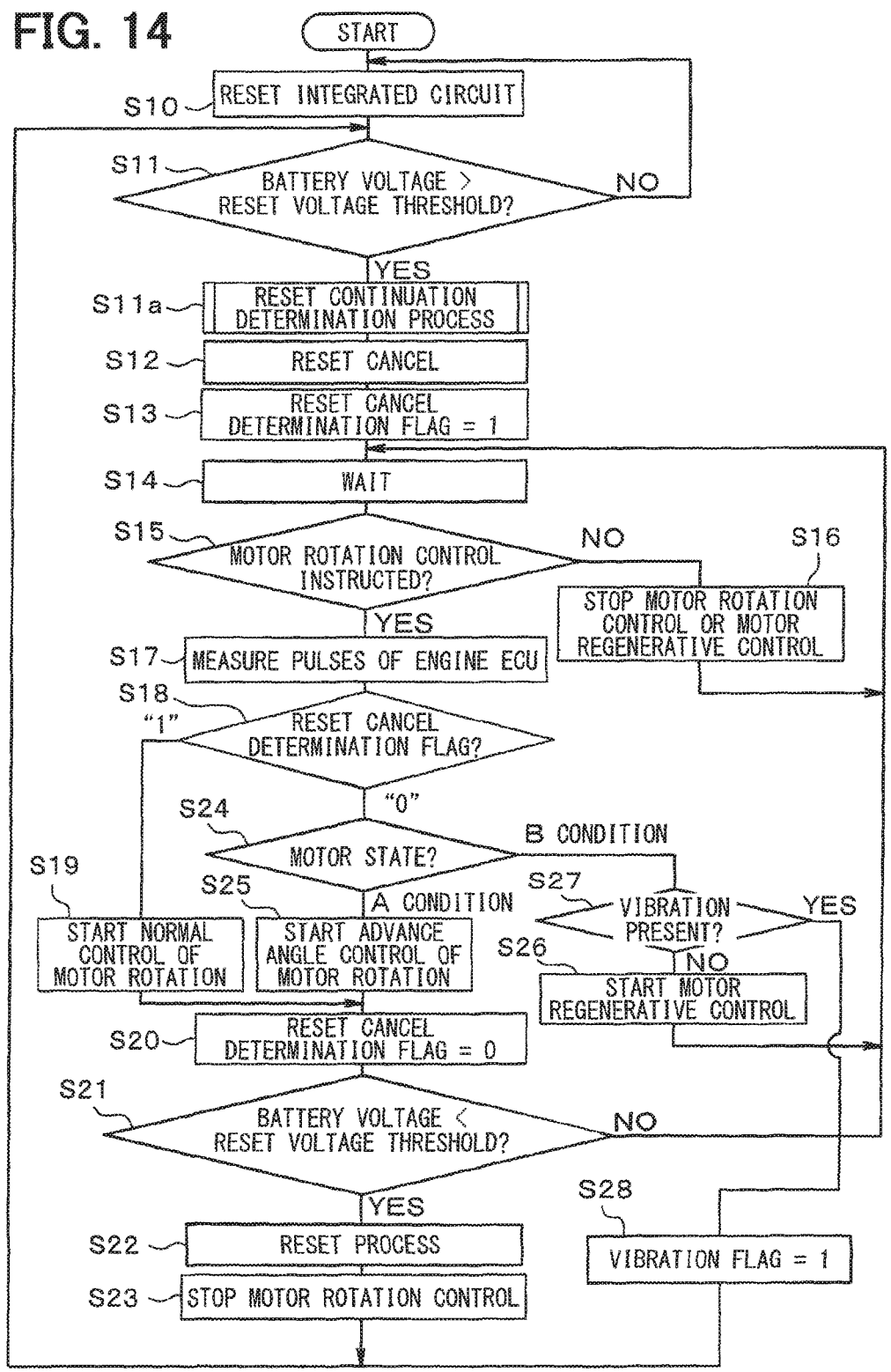
FIG. 14 is a flowchart schematically showing the operation.
Figure 15:
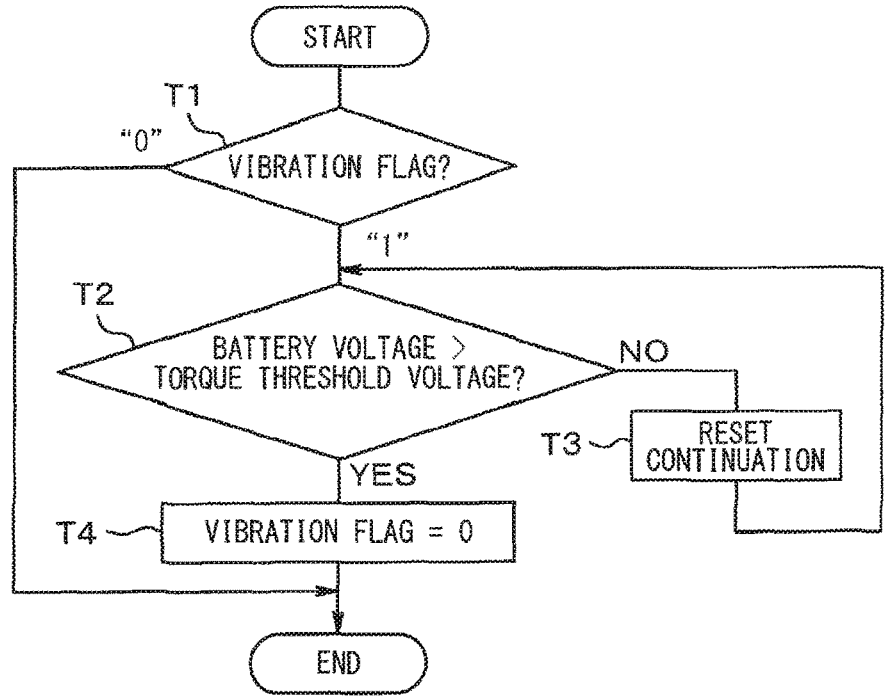
FIG. 15 is a flowchart schematically showing reset continuation determination processing.

The operation described above will be described with reference to FIGS. 14 to 15. FIG. 14 and FIG. 15 are flowcharts in place of FIG. 11. A description will be made centering on the processing contents of FIGS. 14 and 15 which are different from those in FIG. 11. As shown in FIG. 14, the rotation control unit 120 determines whether the battery voltage VB is higher than the reset voltage threshold of the integrated circuit 26, or not, by the battery detection unit 121. After having determined that the condition is satisfied, the rotation control unit 120 performs a reset continuation determination process in S11a before the reset is cancelled in S12. As schematically shown in the reset continuation determination process in FIG. 15, it is determined whether the vibration flag is "0" or "1". The vibration flag is set to "1" when it is determined by the vibration detection unit 120c that there is vibration, and is set to "0" when it is determined that there is no vibration, and is stored in the storage unit. When the vibration detection unit 120c determines that the vibration in the rotation direction is absent, the rotation control unit 120 completes the reset continuation determination process and performs the processing of S12 to S25 described in the first embodiment.

When performing a series of processing shown in FIG. 14, if the condition B is satisfied in S24, the rotation control unit 120 determines the presence or absence of vibration in the rotation direction by the vibration detection unit 120c in S27. Since the vibration detection method by the vibration detection unit 120c is described above, a description of the vibration detection method will be omitted. In this example, if it is determined by the vibration detection unit 120c that there is no vibration, the rotation control unit 120 starts the regenerative control of the motor 15 in S26 while the vibration flag is set to "0". Since the operation at this time is the same as that in the first embodiment, a description of the operation will be omitted. Conversely, the rotation control unit 120 sets the vibration flag to "1" in S28 on the condition that the vibration detection unit 120c determines that the vibration is present, and returns the processing to S11.

Returning to S11, when the battery detection unit 21 determines that the condition that the battery voltage VB exceeds the reset voltage threshold is satisfied, the rotation control unit 120 shifts to a reset continuation determination process in S11a.

Since the vibration flag is set to "1" in the reset continuation determination process, the rotation control unit 120 performs the determination of "1" in T1 and performs processing from T2 to T4. At T2, the rotation control unit 120 determines whether the battery voltage VB detected by the battery detection unit 21 exceeds a predetermined torque threshold voltage, or not. As described above, the reset voltage threshold is predetermined to a voltage value at which the integrated circuit 26 can normally operate even when the reset of the integrated circuit 26 is cancelled. On the other hand, the torque threshold voltage is predetermined as a threshold of the battery voltage VB so that the torque required for the motor 15 is sufficient.

Therefore, when it is determined that the battery voltage VB is equal to or lower than the torque threshold voltage at T2, the rotation control unit 120 continues the reset processing at T3. For that reason, the drive control unit 120b of the rotation control unit 120 continues to stop the drive of the motor 15 by the motor drive unit 22. Then, the rotation control unit 120 waits until the battery voltage VB rises above the torque threshold voltage, and after it is detected that the battery voltage VB exceeds the torque threshold voltage, the rotation control unit 120 sets the vibration flag to "0" at T4.

In other words, after having confirmed that the battery voltage VB has increased to exceed the torque threshold voltage, the rotation control unit 120 cancels the reset in S12. Then, the drive control unit 120b of the rotation control unit 120 causes the motor drive unit 22 to start driving the motor 15. As a result, when the motor 15 vibrates in the rotation direction, the rotation control unit 120 waits until the battery voltage VB exceeds the torque threshold voltage, to thereby prevent the reset from being cancelled. If the battery voltage VB exceeds the torque threshold voltage, because the required torque of the motor 15 is sufficient, even if the drive control unit 120b causes the motor drive unit 22 to start driving the motor 15, the rotation direction of the motor 15 is kept constant to the clockwise direction CW or the counterclockwise direction CCW. As a result, the operation reliability can be further improved as compared with the configuration of the first embodiment.

Specifically, when the vibration is detected by the vibration detection unit 120c, the battery detection unit 21 determines whether the battery voltage VB exceeds a predetermined torque threshold voltage, or not. The drive control unit 120b of the rotation control unit 120 stops the driving of the motor 15 by the motor drive unit 22 until it is determined that the battery voltage VB exceeds the torque threshold voltage. The motor drive unit 22 starts driving the motor 15 on the condition that it is determined that the battery voltage VB exceeds the torque threshold voltage. Since the battery voltage VB is sufficiently high after the reset has been cancelled, the motor 15 easily rotates in one direction, the vibration in the rotation direction can be reduced, and the operation reliability can be further improved as compared with the first embodiment.

(Third Embodiment)

Figure 16:
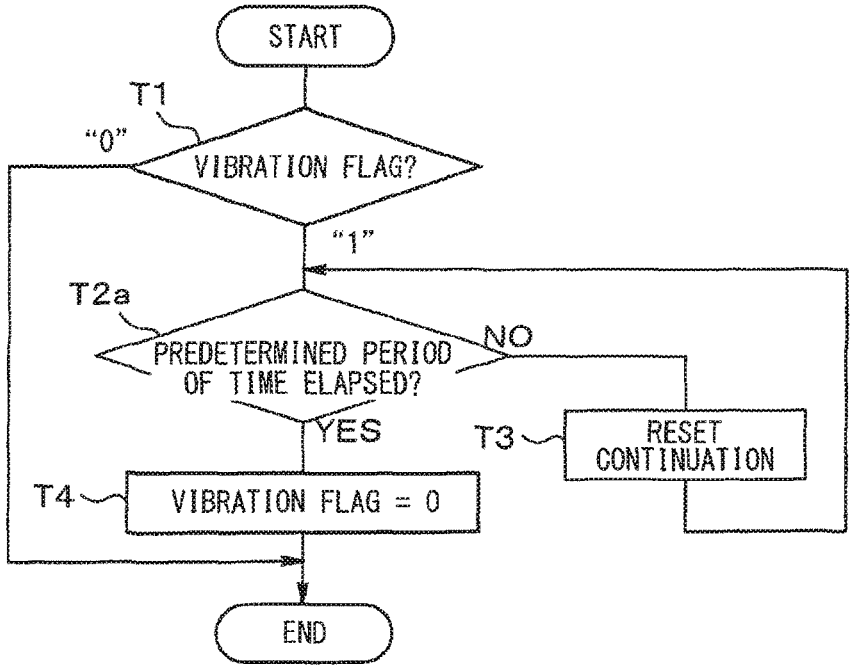
FIG. 16 is a flowchart schematically showing reset continuation determination processing according to a third embodiment.

FIG. 16 shows an illustrative view according to a third embodiment. FIG. 16 schematically shows the contents of a reset continuation determination process in place of FIG. 15. As shown in FIG. 16, when it is determined that a vibration flag is "1" in T1, a rotation control unit 120 may determine whether a predetermined time has elapsed, or not, with the use of, for example, a timer in T2a, and may determine that the reset is continued, or not, in T3.

In other words, if the predetermined time has not elapsed, a drive control unit 120b of the rotation control unit 120 stops driving a motor 15 by a motor drive unit 22 until it is determined that the predetermined time has elapsed. When the predetermined time has elapsed, the drive control unit 120b of the rotation control unit 120 starts to drive the motor 15 by the motor drive unit 22. Therefore, if it can be guaranteed that the battery voltage VB has increased to such an extent that the battery voltage VB does not oscillate after the lapse of the predetermined time, as shown in FIG. 16, the vibration control unit 120b may set the vibration flag to "0" in T4, and thereafter the drive control unit 120b may start to drive the motor 15 by the motor drive unit 22 on the condition that the predetermined time has elapsed in T2a.

In the present embodiment, the drive control unit 120b stops driving the motor 15 only for a predetermined time on the condition that the vibration has been detected by a vibration detection unit 120c, and after a predetermined time has elapsed, the motor drive unit 22 starts to drive the motor 15. As a result, the operation reliability can be further improved as compared with the first embodiment. Also in the third embodiment, the same operation and effects as those of the second embodiment are exerted, and even without setting the torque threshold voltage, the reset state can be continued assuming that the battery voltage VB is reduced.

(Fourth Embodiment)

Figure 17:
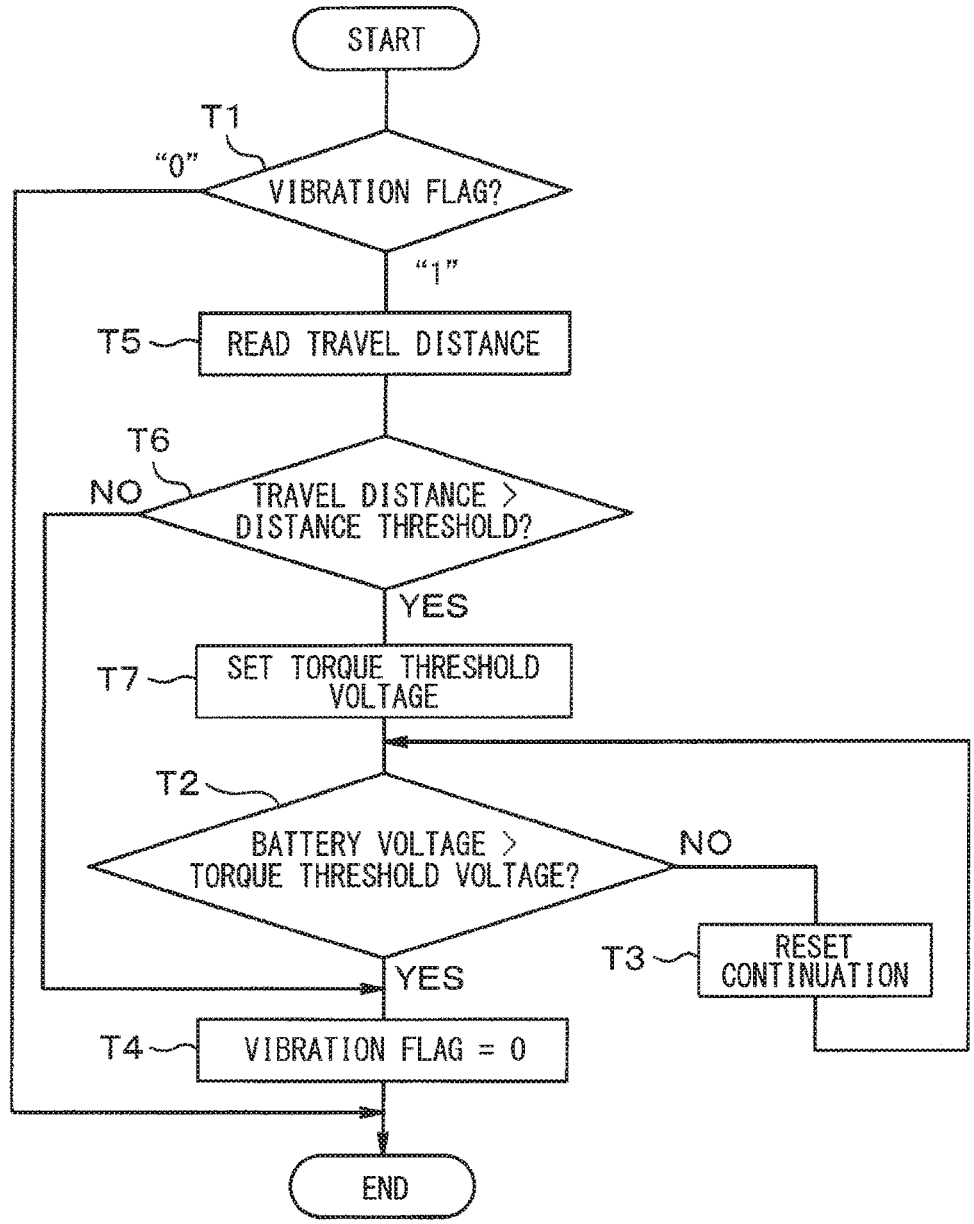
FIG. 17 is a flowchart schematically showing reset continuation determination processing according to a fourth embodiment.

FIG. 17 is an illustrative view according to a fourth embodiment. FIG. 17 schematically shows the contents of the reset continuation determination process in place of FIG. 15. When a motor 15 is deteriorated with time, the detent torque tends to increase from an initial state. For that reason, when the detent torque increases, it is difficult for the motor 15 to start rotating. In that case, it is desirable to apply a higher voltage to the motor 15 from a motor drive unit 22. At this time, it is preferable to provide a deterioration determination unit 120a for determining a deterioration state of the vehicle.

As shown in FIG. 12, travel distance information is given to an engine ECU 17. The engine ECU 17 acquires the travel distance information through an in-vehicle network not shown, and the travel distance information is given to a rotation control unit 120 of an EDU 114.

It is desirable that the rotation control unit 120 of the EDU 114 determines a deterioration state of a vehicle as indicated by T5 and T6 by the deterioration determination unit 120a on condition that a vibration flag is "1" in T1 shown in FIG. 17, and performs the processing of T2 to T4 on the condition that it is determined that the vehicle is in a deterioration state.

The rotation control unit 120 acquires and reads the travel distance information from the engine ECU 17 in T5, and determines in T6 whether the travel distance information exceeds a predetermined distance threshold value, or not. In this case, when the travel distance information is equal to or smaller than the distance threshold, it is determined that the vehicle has not reached the deterioration state, and after the vibration flag has been set to "0" in T4, the reset continuation determination process is completed. As a result, the vibration flag can be set to "0" even if the conditions of T2 and T3 are not satisfied, and a drive control unit 120b can start to drive the motor 15 by the motor drive unit 22.

Conversely, when it is determined that the travel distance information exceeds the distance threshold in T6, the rotation control unit 120 determines whether to continue resetting in T2, or not. As a result, the processing from T2 to T3 is not performed until the travel distance of the vehicle exceeds the distance threshold, and the processing from T2 to T3 is performed after the vehicle is considered to be in the deterioration state.

In the present embodiment, the rotation control unit 120 executes the processing of T5 and T6 by the deterioration determination unit 120a on the condition that the vibration is detected by a vibration detection unit 120c. The rotation control unit 120 performs a power supply voltage determination process shown in T2 to T3 when it is determined that the vehicle is in the deterioration state. The rotation control unit 120 sets the vibration flag to "0" and cancels the reset in T4 when it is determined that the vehicle is not in the deterioration state. The drive control unit 120*b* of the rotation control unit 120 starts to drive the motor 15 by the motor drive unit 22.

For that reason, unnecessary processing can be reduced and processing can be performed quickly when the deterioration state of the components of the vehicle is not advanced. On the contrary, when it is deemed that the vehicle is in the deterioration state, the driving of the motor 15 is started on the condition that the battery voltage VB becomes larger than the torque voltage threshold. Therefore, even if the detent torque increases with aged deterioration, the motor 15 tends to smoothly rotate in one direction, and the generation of the vibration state in the rotational direction can be reduced.

(Modification of Fourth Embodiment)

The condition T6 may be omitted and the deterioration determination unit 120*a* of the rotation control unit 120 may set the torque voltage threshold of the battery voltage VB to be larger as the travel distance increases more. In that case, even if the detent torque gradually increases with the aged deterioration, the torque voltage threshold is set to be larger accordingly. Therefore, the condition of the battery voltage VB at the time of starting to drive the motor 15 can be set to be higher, and more appropriate control is enabled.

The deterioration determination unit 120*a* of the rotation control unit 120 is configured to determine that the vehicle is in the deteriorated condition on the condition that the travel distance information exceeds the distance threshold in T6, but the present disclosure is not limited to the above configuration. For example, instead of the condition of T6, it may be determined whether the vehicle is in the deterioration state, or not, by referring to the activation frequency information of the motor drive unit 22 stored in the activation frequency storage unit 27.

Further, when the condition of T6 is omitted, the rotation control unit 120 may set the torque voltage threshold to be larger as the number of times of activations increases more. Also in that case, more appropriate control is enabled.

(Fifth Embodiment)

Figure 18:
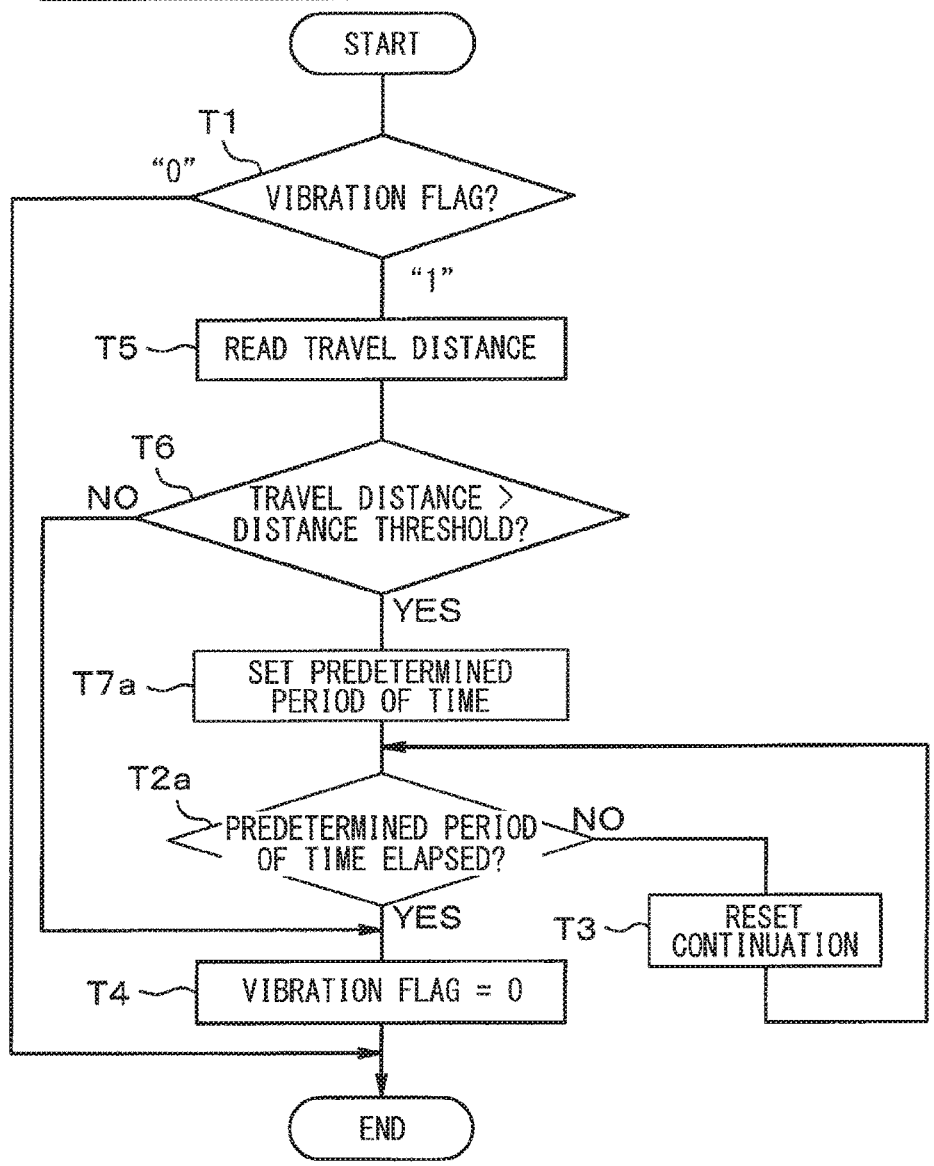
FIG. 18 is a flowchart schematically showing reset continuation determination processing according to a fifth embodiment.

FIG. 18 is an illustrative view according to a fifth embodiment. FIG. 18 schematically shows the details of a reset continuation determination process in place of FIG. 15 to FIG. 17. As shown in FIG. 18, when determining that travel distance information exceeds a distance threshold in T6, a rotation control unit 120 adds a condition of T2*a* and determines whether to continue resetting, or not. As a result, the processing from T2*a* to T3 is not performed until the travel distance of the vehicle exceeds the distance threshold, and the processing of T2*a* to T3 is performed after the components of the vehicle are deemed to be in the deterioration state.

The operation of the present embodiment will be described. On the condition that the vibration is detected by a vibration detection unit 120*c*, the rotation control unit 120 executes the processing of T5 and T6 by a deterioration determination unit 120*a*. When the vehicle is regarded as being in the deterioration state, a progress determination process is performed for a predetermined time of T2*a* to T3. Conversely, when the deterioration determination unit 120*a* determines that the vehicle is not in the deterioration state, the rotation control unit 120 sets the vibration flag to "0" in T4 to cancel the reset, and a drive control unit 120*b* of the rotation control unit 120 causes a motor drive unit 22 to start driving a motor 15. For that reason, unnecessary processing can be reduced and processing can be performed quickly.

(Modification of Fifth Embodiment)

The condition T6 may be omitted and the deterioration determination unit 120*a* of the rotation control unit 120 may set the predetermined time to be longer as the travel distance becomes longer. In this case, even if the detent torque gradually increases with the aged deterioration, the predetermined time is set to be longer accordingly. For that reason, the condition of the battery voltage VB at the time of starting to drive the motor 15 can be made more severe, and more appropriate control is enabled.

The deterioration determination unit 120*a* of the rotation control unit 120 is configured to determine that the vehicle is in the deteriorated condition on the condition that the travel distance information exceeds the distance threshold in T6, but the present disclosure is not limited to the above configuration. For example, instead of the condition of T6, it may be determined whether the vehicle is in the deterioration state, or not, by referring to the activation frequency information of the motor drive unit 22 stored in an activation frequency storage unit 27.

Further, when the condition of T6 is omitted, the rotation control unit 120 may set the predetermined time to be longer as the number of times of activations increases more (T7*a*). Also in that case, more appropriate control is enabled.

(Sixth Embodiment)

FIGS. 19 to 22 illustrate illustrative views of a sixth embodiment. For example, in the second embodiment, the mode in which the vibration detection unit 120*c* detects vibration with the use of the signal from the magnetic sensor 25 has been described. On the other hand, in the sixth embodiment, a vibration detection unit 120*c* detects the vibration with the use of an induced voltage of each phase of a motor 15.

Figure 19:
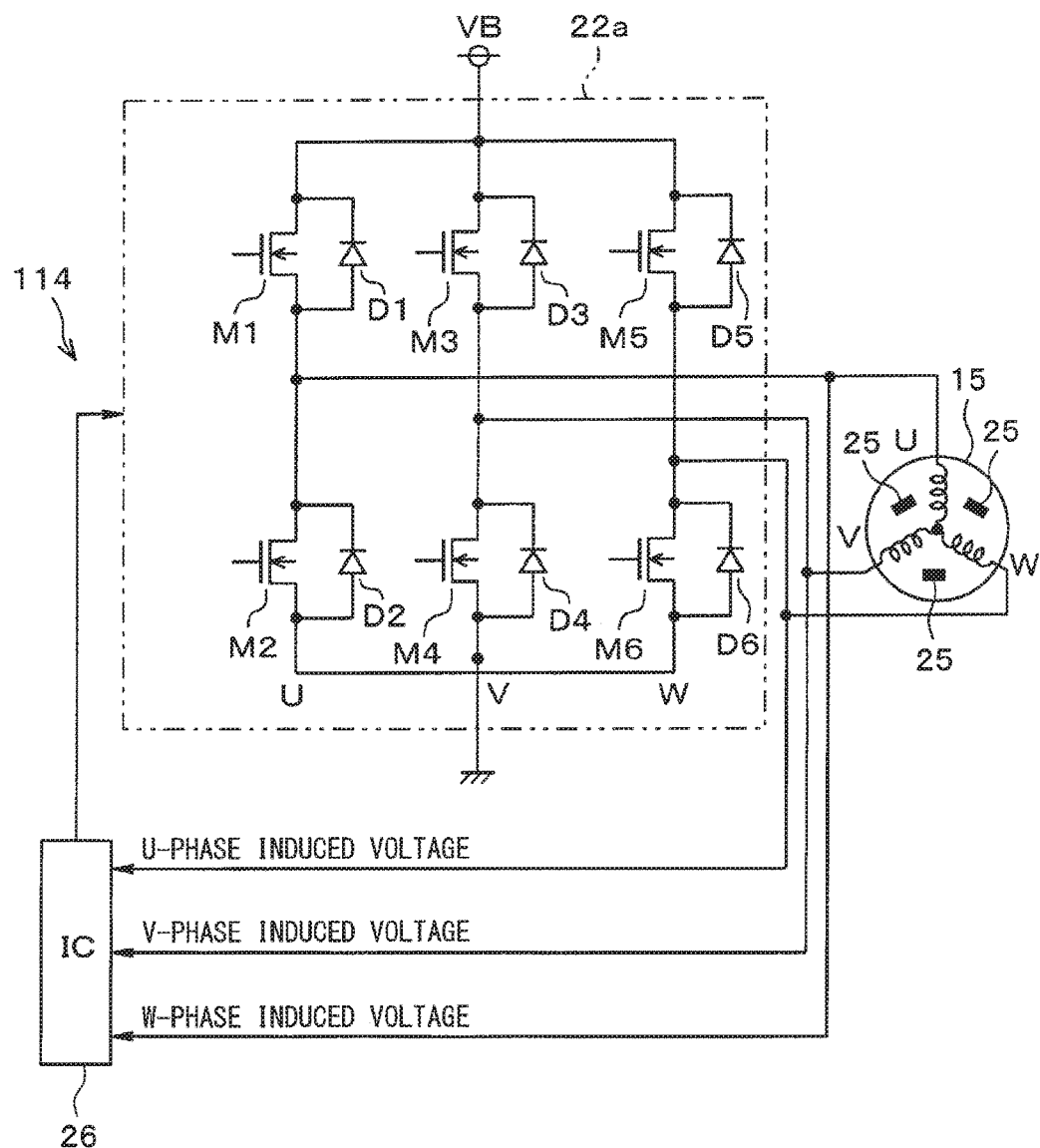
FIG. 19 is a block diagram schematically illustrating a configuration of an EDU according to a sixth embodiment.
Figure 20:
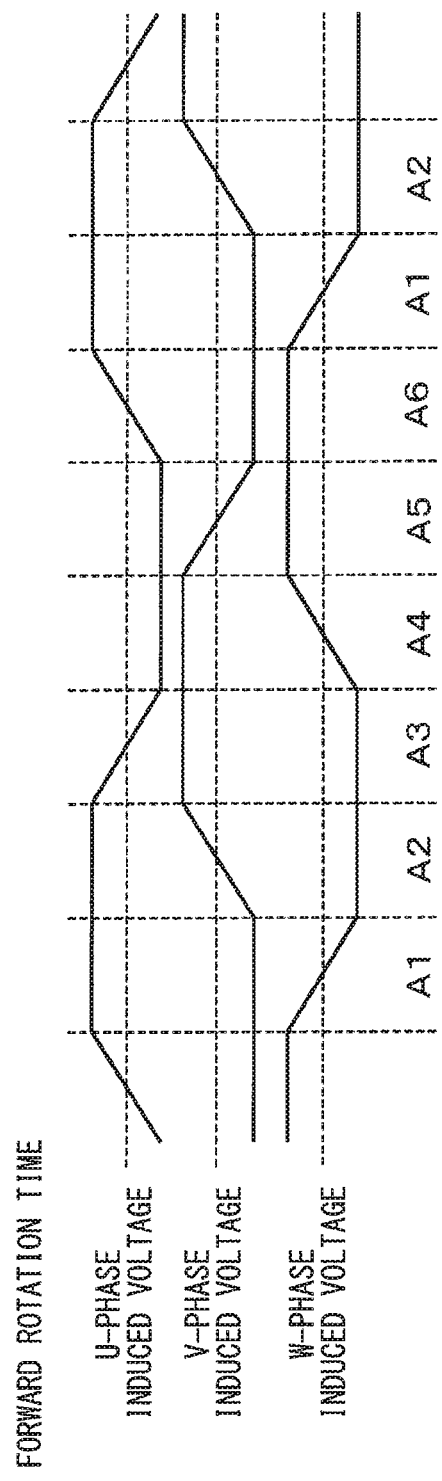
FIG. 20 is a diagram schematically showing an induced voltage of each phase during a forward rotation.

An EDU 114 includes an integrated circuit 26, and as shown in FIG. 19, the integrated circuit 26 receives an induced voltage of each of a U-phase, a V-phase, and a W-phase. In such a case, when the vibration detection unit 120*c* of a rotation control unit 120 of the EDU 114 detects vibration, the induced voltage of each phase of the motor 15 may be used. The induced voltage of each phase of the U-phase, the V-phase, and the W-phase of the motor 15 in the forward rotation can be detected as shown in FIG. 20. As shown in FIG. 20 as an example, in the forward rotation (for example, a clockwise direction CW), the induced voltages of the U-phase, the V-phase, and the W-phase are sequentially shifted in patterns A1, . . . , A6, A1, . . . in the stated order. For that reason, the vibration detection unit 120*c* detects the induced voltage, thereby being capable of detecting that the motor 15 is rotating in the forward rotation direction.

Figure 21:
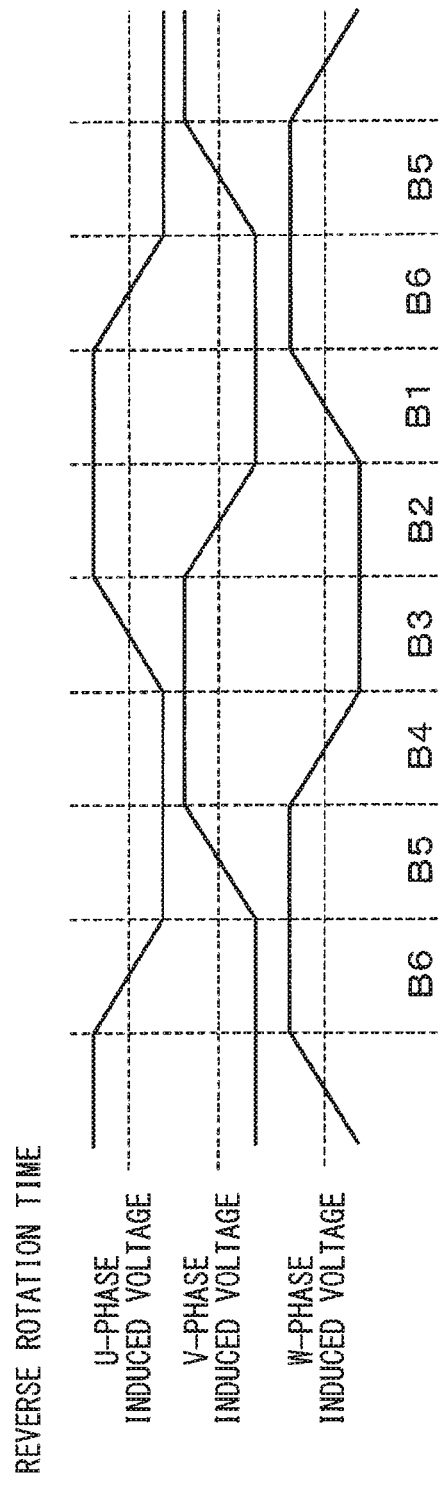
FIG. 21 is a diagram schematically showing an induced voltage of each phase during a reverse rotation.

The change is reversed at the time when the motor 15 rotates in a reverse direction (for example, counterclockwise direction CCW). The induced voltage of each phase of the U-phase, the V-phase, and the W-phase of the motor 15 in the reverse rotation can be detected as shown in FIG. 21. As shown in FIG. 21 as an example, in the reverse rotation, the induced voltages of the U-phase, the V-phase, and the W-phase are sequentially changed in patterns B6, . . . , B1, B6, . . . in the stated order. For that reason, the vibration detection unit 120*c* detects the induced voltage of each phase, thereby being capable of detecting that the motor 15 is rotating in the reverse rotation direction.

The vibration detection unit 120*c* determines whether the motor 15 is in the forward rotation state, the motor 15 is in the reverse rotation state, or vibration is made while the forward state and the reverse state are repeated based on the pattern of the induced voltages in the forward rotation, the pattern of the induced voltages in the reverse rotation, and the pattern of the actual respective phases, thereby being capable of detecting whether the motor 15 is vibrating, or not FIG. 22 shows a change in pattern of the induced voltage of each phase during the vibration.

As shown in FIG. 22, the induced voltage varies as in the patterns A1, A2, A3, and A4 at the time of forward rotation, but if the motor 15 rotates in the reverse direction, a change appears in an induced voltage waveform as indicated by the patterns B4, B3, and B2. In this case, the vibration detection unit 120c detects that the pattern has changed from the pattern A1 to the pattern A3 and from the pattern B4 to the pattern B2, to thereby detect that the rotation reaches the reverse rotation from the forward rotation.

Thereafter, the vibration detection unit 120c detects that the induced voltage of each phase has changed from the pattern A3 to the pattern A6 in order, to thereby further detect that the rotation reaches the forward rotation from the reverse rotation state. As a result, the vibration detection unit 120c detects a vibration state in which the motor 15 repeats forward rotation, reverse rotation, and forward rotation. In this manner, the vibration detection unit 120c may detect whether to vibrate with the use of the induced voltage of each phase, or not. According to the present embodiment, the same operation and effects as those of the above embodiment can be obtained.

The present disclosure is not limited to the above-mentioned embodiments, and may be applied, for example, by combining the above-mentioned embodiments.

The invention claimed is:

1. A motor drive device for controlling a valve timing of an internal combustion engine comprising:
   a motor drive unit that is driven by a power supply voltage and that controls a phase of a camshaft to drive a motor for controlling opening and closing operation of a valve; and
   a determination unit that determines whether a timing is to start up the motor or to normally drive the motor, wherein
   the motor drive unit drives the motor with an advance angle when the determination unit determines that the timing is to normally drive the motor, and the motor drive unit normally drives the motor without the advance angle when the determination unit determines that the timing is to start up the motor,
   the motor drive device further comprising:
   a power supply voltage determination unit that determines whether the power supply voltage exceeds a torque threshold voltage after a vibration is detected by a vibration detection unit for detecting the vibration in a rotational direction of the motor; and
   a drive control unit that stops driving by the motor drive unit until the power supply voltage determination unit determines that the power supply voltage exceeds the torque threshold voltage, the drive control unit starting the driving by the motor drive unit on condition that the power supply voltage determination unit determines that the power supply voltage exceeds the torque threshold voltage.

2. The motor drive device according to claim 1, further comprising:
   a detection unit that detects a power supply voltage for driving the motor, wherein
   the motor drive unit drives the motor on condition that the power supply voltage for driving the motor detected by the detection unit exceeds a threshold.

3. The motor drive device according to claim 1, wherein the motor drive unit drives the motor to match a phase of an applied voltage applied to the motor with a phase of an induced voltage when normally driving the motor.

4. The motor drive device according to claim 1, wherein the motor drive unit drives the motor with the advance angle in an applied voltage applied to the motor relative to an induced voltage of the motor when driving the motor with the advance angle.

5. The motor drive device according to claim 1, further comprising:
   an acquisition unit that acquires travel distance information on a vehicle or activation frequency information on the motor drive unit; and
   a deterioration determination unit that determines a deterioration state of components of the vehicle according to the travel distance information on the vehicle or the activation frequency information on the motor drive unit, wherein
   the power supply voltage determination unit performs determination process on the power supply voltage on condition that the deterioration determination unit determines the deterioration state, and
   the drive control unit stops or starts the driving by the motor drive unit according to a determination result of the power supply voltage determination unit.

6. The motor drive device according to claim 1, further comprising:
   an acquisition unit that acquires information on a travel distance of a vehicle or information on an activation frequency of the motor drive unit; and
   a setting unit that sets the torque threshold voltage to be larger as the travel distance of the vehicle is longer or the activation frequency of the motor drive unit is increased more.

7. The motor drive device according to claim 1, wherein the drive control unit stops the driving of the motor for a predetermined period of time on condition that the vibration is detected by the vibration detection unit for detecting the vibration of the motor, and starts the driving by the motor drive unit after the predetermined period of time has elapsed.

8. The motor drive device according to claim 7, further comprising:
   a deterioration determination unit that determines a deterioration state of components of a vehicle according to the travel distance information on the vehicle or the activation frequency information on the motor drive unit, wherein
   the drive control unit stops the driving by the motor drive unit for a predetermined period of time on condition that the vibration is detected by the vibration detection unit, and that the deterioration state is determined by the deterioration determination unit, and starts the driving by the motor drive unit after the predetermined period of time has elapsed.

9. The motor drive device according to claim 7, further comprising:
   an acquisition unit that acquires information on a travel distance of a vehicle or information on an activation frequency of the motor drive unit; and a setting unit that sets the predetermined time of period to be longer as the travel distance of the vehicle is longer or the activation frequency of the motor drive unit is increased more.

* * * * *